(12) United States Patent
Matsuo et al.

(10) Patent No.: US 12,273,297 B2
(45) Date of Patent: Apr. 8, 2025

(54) BASE STATION, TERMINAL, AND COMMUNICATION METHOD

(71) Applicant: Panasonic Corporation, Osaka (JP)

(72) Inventors: Hidenori Matsuo, Kanagawa (JP); Yuta Seki, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 332 days.

(21) Appl. No.: 17/690,696

(22) Filed: Mar. 9, 2022

(65) Prior Publication Data

US 2022/0294579 A1 Sep. 15, 2022

(30) Foreign Application Priority Data

Mar. 11, 2021 (JP) ................. 2021-039150

(51) Int. Cl.
*H04L 5/00* (2006.01)
*H04W 24/08* (2009.01)
*H04B 7/0413* (2017.01)

(52) U.S. Cl.
CPC ............ *H04L 5/006* (2013.01); *H04L 5/0048* (2013.01); *H04W 24/08* (2013.01); *H04B 7/0413* (2013.01)

(58) Field of Classification Search
CPC ...... H04L 5/006; H04L 5/0048; H04W 24/08; H04W 24/10; H04B 7/0413; H04B 7/0617; H04B 7/024
USPC ................................................ 370/329–330
See application file for complete search history.

(56) References Cited

U.S. PATENT DOCUMENTS

| 2009/0052405 A1* | 2/2009 | Ko ........................ H04L 5/0053 370/335 |
| 2011/0275397 A1* | 11/2011 | Guey .................... H04W 16/12 455/509 |
| 2012/0220333 A1* | 8/2012 | Zhu ........................ H04B 7/024 455/525 |
| 2012/0314665 A1* | 12/2012 | Ishida .................... H01Q 21/28 370/329 |
| 2013/0029711 A1* | 1/2013 | Kang ................... H04B 7/0691 455/517 |
| 2014/0078973 A1* | 3/2014 | Kazmi .................. H04W 24/02 370/329 |
| 2014/0342768 A1* | 11/2014 | Soldati .................. H04W 52/10 455/522 |
| 2016/0197709 A1 | 7/2016 | Shen et al. |

(Continued)

FOREIGN PATENT DOCUMENTS

| JP | 2014-529945 A | 11/2014 |
| JP | 2015-053569 A | 3/2015 |
| WO | 2013025558 A1 | 2/2013 |

OTHER PUBLICATIONS

Kimura et al., "Inter-Cell Interference Coordination (ICIC) Technology," *Fujitsu* 62(4):455-460, Jul. 2011. (with English translation).

(Continued)

*Primary Examiner* — Candal Elpenord
(74) *Attorney, Agent, or Firm* — Seed IP Law Group LLP

(57) ABSTRACT

A base station includes communication circuitry which, in operation, transmits or receives a reference signal in a plurality of bands using a part of a plurality of antennas, and control circuitry which, in operation, determines which of the plurality of bands to allocate to a terminal, based on a result of measurement using the reference signal.

9 Claims, 15 Drawing Sheets

(56) References Cited

U.S. PATENT DOCUMENTS

| | | | |
|---|---|---|---|
| 2018/0262250 A1* | 9/2018 | Kim | H04B 17/309 |
| 2018/0269939 A1* | 9/2018 | Hu | H04B 7/0617 |
| 2019/0123801 A1* | 4/2019 | Yum | H04L 5/0064 |
| 2021/0014085 A1* | 1/2021 | Chen | H04B 7/0691 |
| 2021/0211957 A1* | 7/2021 | Kamohara | H04W 36/06 |

OTHER PUBLICATIONS

Takahashi et al., "Adaptive Interference/Radio Resource Management Integrating Inner-cell Interference Coordination and Inter-cell Interference Coordination for 5G Advanced Ultra-dense RAN," IEICE Technical Report, RCS2020-227(Mar. 2021), The Institute of Electronics Information and Communication Engineers, 2021, 13 pages. (With English Translation).

\* cited by examiner

BASE STATION, TERMINAL, AND COMMUNICATION METHOD

BACKGROUND

1. Technical Field

The present disclosure relates to a base station, a terminal, and a communication method.

2. Description of the Related Art

With an increase in mobile traffic, a method for increasing a capacity of a system has been studied. As the method for increasing a capacity of a system, a distributed Multiple-Input Multiple-Output (MIMO) cooperative transmission system is studied.

SUMMARY

In order to increase a capacity of a distributed Multiple-Input Multiple-Output (MIMO) cooperative transmission system, for example, interference in or between cells is hoped to be reduced as much as possible. To reduce such interference, for example, reception quality measurement is used. However, a method for measuring reception quality in a wireless communication system such as a distributed MIMO cooperative transmission system has not been sufficiently studied.

One non-limiting and exemplary embodiment of the present disclosure facilitates providing a base station, a terminal, and a communication method capable of improving the efficiency of reception quality measurement.

A base station according to one example of the present disclosure includes communication circuitry which, in operation, transmits or receives a reference signal in a plurality of bands using a part of a plurality of antennas, and control circuitry which, in operation, determines which of the plurality of bands to allocate to a terminal, based on a result of measurement using the reference signal.

It should be noted that general or specific embodiments may be implemented as a system, a method, an integrated circuit, a computer program, a storage medium, or any selective combination thereof.

According to one example of the present disclosure, the efficiency of reception quality measurement in a wireless communication system can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Hereinafter, exemplary embodiments of the present disclosure will be described in detail with reference to the drawings.

Figure 1:
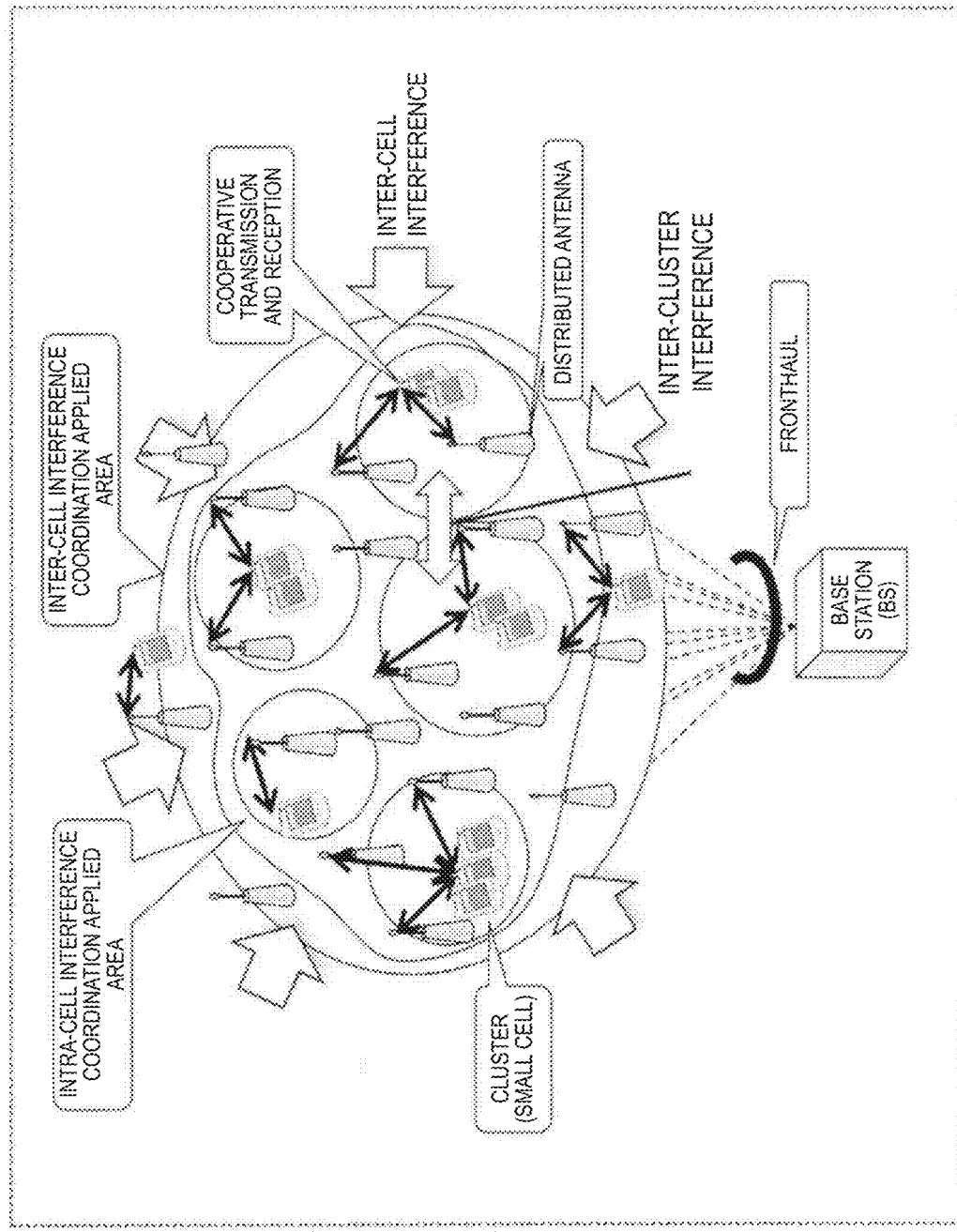
FIG. 1 is a diagram illustrating an example of a distributed Multiple-Input Multiple-Output (MIMO) cooperative transmission system.

FIG. 1 is a diagram illustrating a configuration example of a distributed Multiple-Input Multiple-Output (MIMO) cooperative transmission system.

As illustrated in FIG. 1, the distributed MIMO cooperative transmission system may have a distributed antenna configuration having a plurality of antennas (for example, referred to as "distributed antennas") dispersedly disposed in a cell. In this configuration, a base station (BS), which is also referred to as, for example, a control station, an Evolved Node B (eNB), or a Next Generation Node B (gNB), centrally controls the distributed antennas via a fronthaul.

Furthermore, as illustrated in FIG. 1, one or a plurality of clusters (or small cells) configured with a plurality of distributed antennas located near a terminal (for example, user equipment: UE) may be formed in a cell. For example, MIMO cooperative transmission may be performed separately for the clusters. Note that a cell formed by the base station may be referred to as, for example, a macro cell in comparison with a small cell.

In the distributed MIMO cooperative transmission system, for example, interference between clusters (hereinafter, referred to as "inter-cluster interference") or interference with peripheral cells (hereinafter, referred to as "inter-cell interference") may occur. Such interference is reduced by intra-cell interference coordination and inter-cell interference coordination for terminals classified into "intra-cell terminals" and "cell edge terminals". In this manner, the capacity of the system is increased.

Note that the intra-cell terminal may be, for example, a terminal located relatively near the center of the cell where interference from adjacent cells is small (for example, less than a threshold). Note that the cell edge terminal may be, for example, a terminal that is greatly (for example, more than or equal to the threshold) interfered by adjacent cells.

Figure 2:
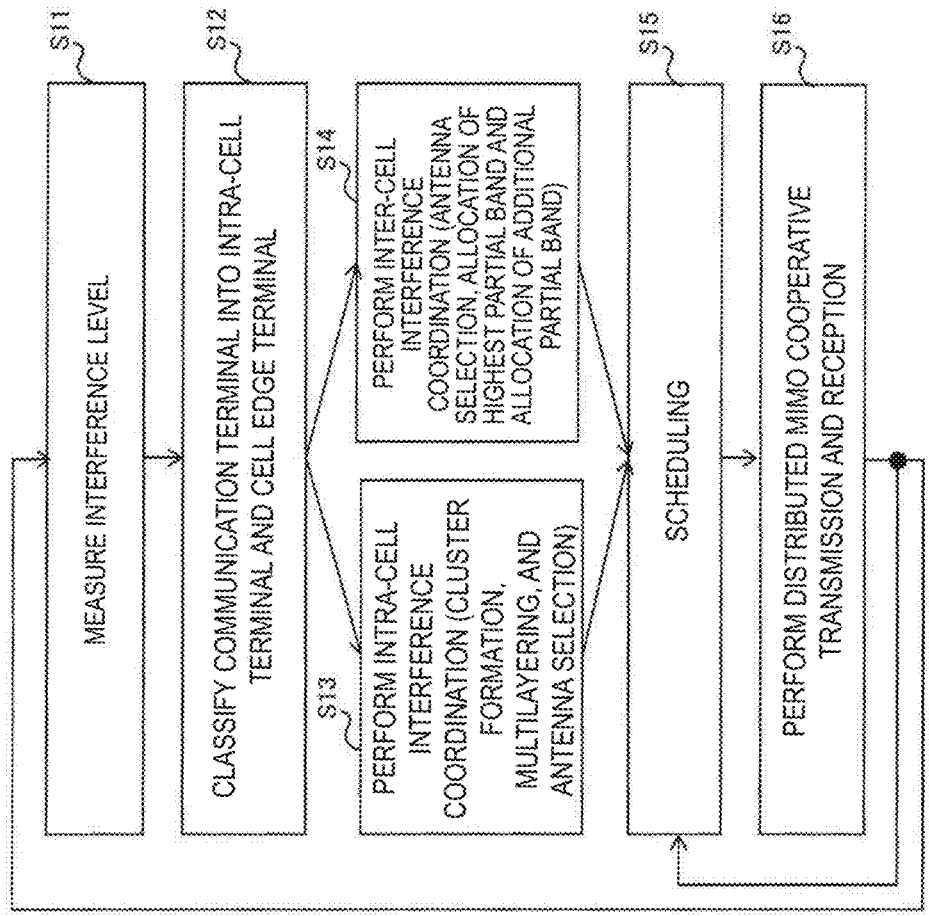
FIG. 2 is a flowchart illustrating an example of processing in the distributed MIMO cooperative transmission system.

FIG. 2 is a flowchart illustrating an example of processing in the distributed MIMO cooperative transmission system using the above-described interference coordination.

In FIG. 2, the terminal measures, for example, a level of interference (for example, power of interference) from another cell (S11). Information about the interference level may be transmitted (fed back) from the terminal to the base station, for example.

For example, the base station classifies the terminal into either "intra-cell terminal" or "cell edge terminal" based on the interference level of the terminal (S12). For example, a terminal whose interference level is less than a threshold may be classified as an intra-cell terminal, and a terminal whose interference level is larger than or equal to the threshold as a cell edge terminal.

The base station may, for example, perform intra-cell interference coordination on the intra-cell terminal (S13). In the intra-cell interference coordination, for example, the base station may associate an intra-cell terminal with a distributed antenna near the intra-cell terminal, based on position information about the intra-cell terminal to form each cluster. In such a manner, interference between the clusters may be reduced. In order to reduce the interference between the clusters, in the intra-cell interference coordination, for example, the base station may perform multilayering that allocates a cluster with great intra-cluster interference to another scheduling layer, and may perform antenna selection in which a nearby antenna is selected based on the position information about the terminal.

The base station may further perform, for example, the inter-cell interference coordination on the cell edge terminal (S14). In the inter-cell interference coordination, for example, the base station may allocate, based on reception quality, a plurality of bands (hereinafter, referred to as "partial bands") obtained by dividing a communication band (for example, at least a portion of a system band) with the bands being orthogonal to each other between the adjacent cells. In such a manner, the inter-cell interference is reduced. Note that the base station may form one cluster (in other words, a distributed antenna near the terminal is selected to form a small cell) for a cell edge terminal, for example, similarly to the intra-cell terminal.

Note that the processing in S13 and the processing in S14 may be executed in parallel, or one of the processing may be executed sequentially after the other processing.

Figure 3:
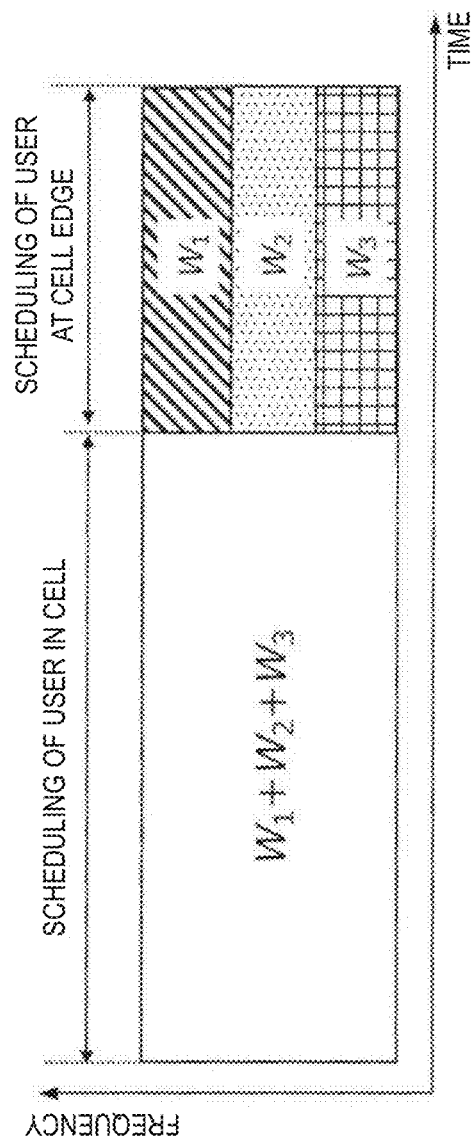
FIG. 3 is a diagram illustrating an example of scheduling.

The base station performs, for example, scheduling (for example, radio resource allocation) for the terminals (S15). FIG. 3 is a diagram illustrating an example of scheduling for an intra-cell terminal (for example, also referred to as an intra-cell user) and a cell edge terminal (for example, also referred to as a cell edge user). As illustrated in FIG. 3, the base station may perform scheduling with radio resources being separated for the intra-cell terminal and the cell edge terminal (time division in FIG. 3). As illustrated in FIG. 3, radio resources may be allocated to the intra-cell terminal in a communication band including partial bands $W_1$, $W_2$, and $W_3$. Radio resources may be allocated to the cell edge terminal in a partial band (any of $W_1$, $W_2$, and $W_3$) allocated to each of cells (three cells in the example of FIG. 3).

In FIG. 2, the base station and the terminal perform distributed MIMO cooperative transmission (for example, transmission and reception) based on a scheduling result, for example (S16). For example, the base station and the terminal may perform multi-user MIMO transmission (MU-MIMO) per cluster using a transmission weight and a reception weight based on the reception quality. Note that a channel estimation value obtained in the distributed MIMO cooperative transmission may be used for other processing (for example, feedback), such as the measurement of the interference level (for example, the processing in S11) and the scheduling (for example, the processing in S15).

The reception quality can be measured in each processing of the distributed MIMO cooperative transmission system described above. However, in a system in which a plurality of distributed antennas is disposed, a method for allocating a reference signal for measuring reception quality to each distributed antenna has not been sufficiently studied.

For example, consider a reception quality measurement in the base station having a plurality of (for example, 128) distributed antennas in one cell—in a case where reference signals orthogonal to each other between the distributed antennas are allocated in order to measure the reception quality of each distributed antenna, more radio resources for the reference signals are used as the number of the distributed antennas increases. Therefore, overheads of the reference signals increase, and thus use efficiency of the radio resources may be reduced.

Figure 4:
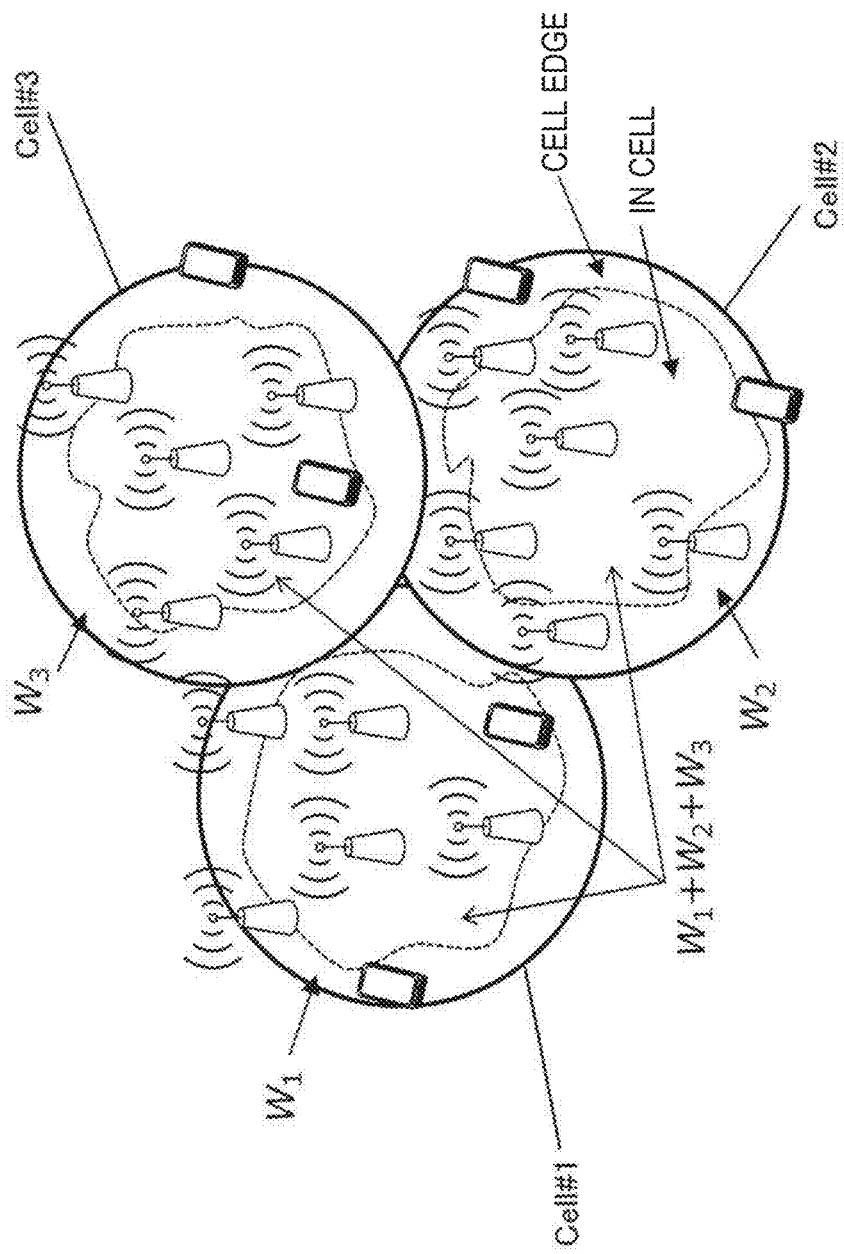
FIG. 4 is a diagram illustrating an example of Fractional Frequency Reuse (FFR)

In addition, as one method of the inter-cell interference coordination, Fractional Frequency Reuse (FFR) is exemplified (see, for example, Dai Kimura and Hiroyuki Seki, "inter-Cell Interference Coordination (ICIC) Technology", FUJITSU, Vol. 62, No. 4 (July 2011)). FIG. 4 is a view illustrating an example of the FFR. As illustrated in FIG. 4, in the FFR, each cell is divided into a center region (hereinafter, referred to as "intra-cell region") and an edge region (hereinafter, referred to as "cell edge region"). A plurality of bands (for example, $W_1+W_2+W_3$) is allocated to the intra-cell region of each cell. A partial band (for example, any of $W_1$, $W_2$, and $W_3$) is allocated individually to the cell edge region of each cell. Different bands are allocated to the cell edge regions between adjacent cells, respectively, by the FFR, and thus interference can be reduced.

In the FFR, in order to allocate different partial bands between adjacent cells, the partial bands may be allocated after the coverage of each cell is examined in advance before operation. However, in this method, since further examination is performed when a network configuration is changed (for example, addition or deletion of a base station), the operation tends to be complicated.

Alternatively, during the operation, individual pieces of interference information may be (for example, periodically) exchanged between base stations (or cells) in the partial bands, and a partial band with lower interference between adjacent cells may be selected. However, with this method, traffic between the base stations (or between the cells) during operation may increase.

As described above, it is desirable that each base station autonomously select partial bands from the viewpoint of network scalability and traffic. In order that each base station autonomously selects partial bands, for example, it is desirable that each base station acquires interference information by itself without information from peripheral base stations. In addition, in the distributed antenna configuration, there is room for study on a method of transmitting and receiving reference signals through a plurality of distributed antennas for interference measurement in partial bands.

In one example of the present disclosure, a method for improving the efficiency of the reception quality measurement in the distributed antenna configuration will be described.

First Exemplary Embodiment

[Configuration of Wireless Communication System]

A wireless communication system according to the present exemplary embodiment includes, for example, at least base station 100 and terminal 200.

Figure 5:
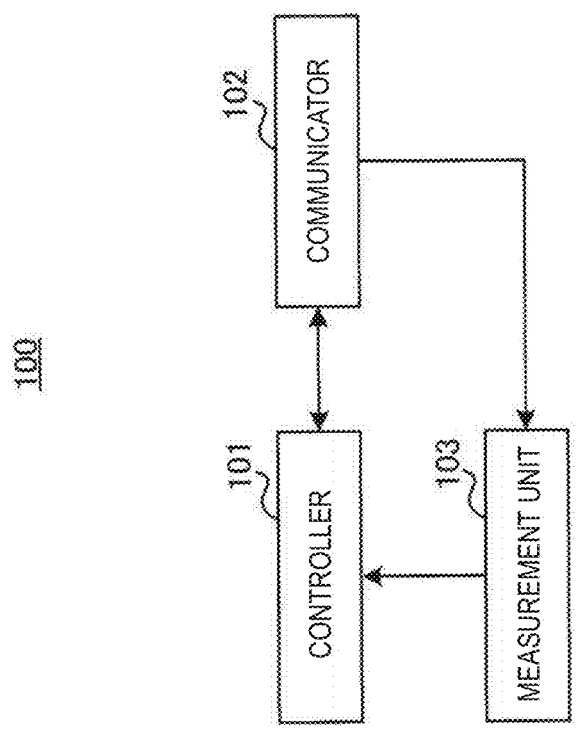
FIG. 5 is a block diagram illustrating a configuration example of a base station according to a first exemplary embodiment.

FIG. 5 is a block diagram illustrating a configuration example of base station 100 according to the present exemplary embodiment.

Base station 100 illustrated in FIG. 5 may include controller 101 (for example, corresponding to control circuitry), communicator 102 (for example, corresponding to communication circuitry), and measurement unit 103.

Note that each component of base station 100 illustrated in FIG. 5 may be functionally distributed to the base station and the distributed antennas illustrated in FIG. 1. For example, controller 101 illustrated in FIG. 5 may correspond to a "base station" that performs centralized control in FIG. 1, and communicator 102 may include the plurality of distributed antennas illustrated in FIG. 1. Furthermore, measurement unit 103 illustrated in FIG. 5 may be included in the "base station" illustrated in FIG. 1 or may be included in each distributed antenna. Alternatively, each component of base station 100 illustrated in FIG. 5 may be included in the distributed antennas illustrated in FIG. 1.

Controller 101 may perform scheduling for terminal 200. For example, controller 101 may determine a communication band (for example, a partial band) to be used by base station 100 (for example, a cell corresponding to base station 100) for communication with terminal 200 in a cell. In addition, controller 101 may allocate a radio resource to terminal 200 in a use band of base station 100.

Controller 101 may determine information about setting of a reference signal for terminal 200. The information about the setting of the reference signal may include, for example, information about a resource to which a downlink reference signal is allocated.

For example, controller 101 may classify terminal 200 into either an intra-cell terminal or a cell edge terminal. Controller 101 may perform interference coordination (for example, either intra-cell interference coordination or inter-cell interference coordination) over terminal 200, based on the classification of terminal 200.

Further, controller 101 may control cooperative transmission and reception control (for example, MIMO cooperative transmission). For example, controller 101 may control setting of a cluster for terminal 200 and generation of downlink and uplink transmission and reception weights.

Controller 101 may control the above-described processing based on, for example, information (for example, information fed back from terminal 200) input from communicator 102 and information about the reception quality of each terminal 200 input from measurement unit 103. In the present exemplary embodiment, controller 101 may perform inter-cell interference coordination based on interference power or a signal to interference ratio (SIR) included in the information about the reception quality fed back from terminal 200. Further, in the present exemplary embodiment, controller 101 may generate a downlink transmission weight based on the interference power or a channel estimation value included in the information about the reception quality fed back from terminal 200. Furthermore, controller 101 may output control information acquired by the above-described processing to communicator 102.

Communicator 102 may have wireless communication with terminal 200. Communicator 102 may transmit the control information input from controller 101 to terminal 200. Further, communicator 102 may receive a signal sent from terminal 200 and output the received signal to controller 101 and measurement unit 103.

Measurement unit 103 may measure (or perform channel estimation) the reception quality (for example, interference power or an SIR) between base station 100 and terminal 200, based on a reference signal included in the signal input from communicator 102. In the present exemplary embodiment, measurement unit 103 may measure reception quality (for example, interference power or channel estimation value) to be used for generating an uplink reception weight, based on a reference signal transmitted from terminal 200. Measurement unit 103 may output information about the measured reception quality to controller 101.

Figure 6:
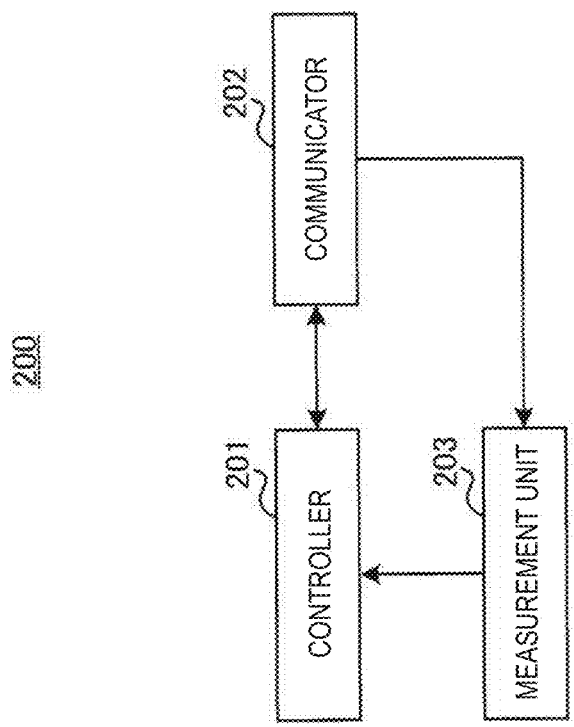
FIG. 6 is a block diagram illustrating a configuration example of a terminal according to the first exemplary embodiment.

FIG. 6 is a block diagram illustrating a configuration example of terminal 200 according to the present exemplary embodiment.

Terminal 200 illustrated in FIG. 6 may include controller 201, communicator 202, and measurement unit 203.

Controller 201 may control the wireless communication based on the control information input from communicator 202. Further, controller 201 may determine a data resource to be allocated to terminal 200. In addition, controller 201 may determine a reference signal resource set by terminal 200, based on the control information.

Further, controller 201 may control cooperative transmission and reception (for example, MIMO cooperative transmission). Controller 201 may control generation of downlink and uplink transmission and reception weights based on the information about the reception quality input from measurement unit 203.

Controller 201 outputs, to communicator 202, information about the reception quality (for example, information about the transmission and reception weights) such as the interference power or the channel estimation value input from measurement unit 203.

Communicator 202 may have wireless communication with base station 100. Communicator 202 may transmit the control information input from controller 201 to base station 100. The control information about the interference coordination may include the information about the reception quality such as interference power or an SIR. Control information about control of cooperative transmission and reception may include the information about the reception quality such as interference power or a channel estimation value. Further, communicator 202 may receive a signal transmitted from base station 100 and output the received signal to controller 201 and measurement unit 203.

Measurement unit 203 may measure (or perform channel estimation) the reception quality (for example, interference power or an SIR) between base station 100 and terminal 200, based on a reference signal included in the signal input from communicator 202. In the present exemplary embodiment, measurement unit 203 may measure the reception quality to be used for the inter-cell interference coordination and the reception quality to be used for generating the downlink transmission weight. Measurement unit 203 may output information about the measured reception quality to controller 201.

[Operation Example of Base Station 100 and Terminal 200]

The operation example of above-described base station 100 and terminal 200 will be described.

Figure 7:
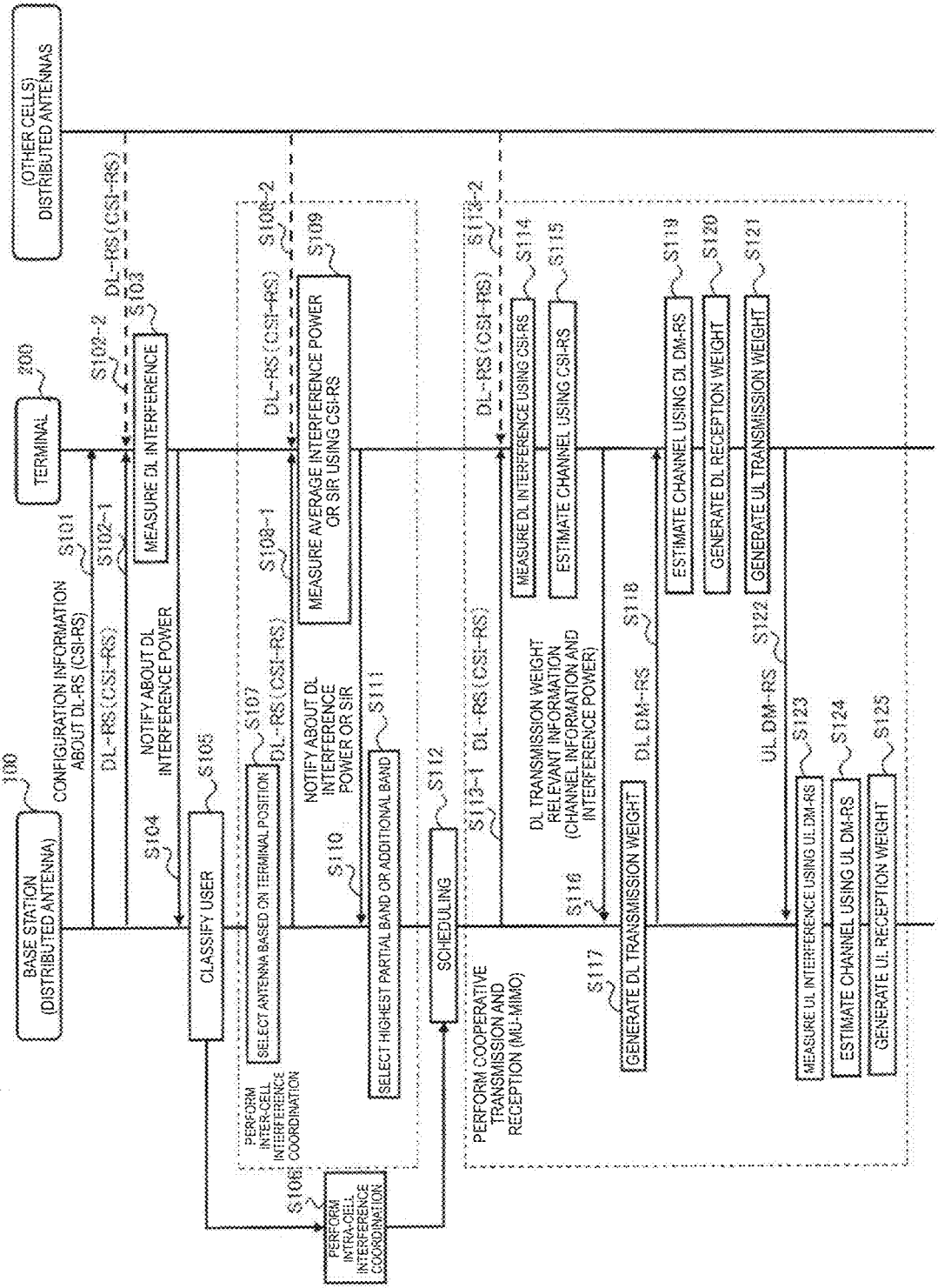
FIG. 7 is a sequence diagram illustrating an operation example of the base station and the terminal according to the first exemplary embodiment.

FIG. 7 is a sequence diagram illustrating the operation example of base station 100 (for example, distributed antennas) and terminal 200.

In FIG. 7, base station 100 transmits, for example, information about the setting of a downlink reference signal (DL-RS) to terminal 200 (S101). The DL-RS may be a channel state information reference signal (CSI-RS) defined in the 3GPP specification. The setting information about the DL-RS may be given by higher layer signaling (referred to also as radio resource control (RRC) signaling or a higher layer parameter) from base station 100 to terminal 200.

Base station 100 transmits, for example, the DL-RS (for example, the CSI-RS) to terminal 200 (S102-1). In addition to the DL-RS from base station 100, terminal 200 may receive a DL-RS (for example, a CSI-RS) from a base station (for example, a distributed antenna) of another cell (S102-2).

Terminal 200 measures, for example, a downlink interference level (for example, interference power) (S103). Terminal 200 may measure the interference power based on the CSI-RS transmitted from each cell.

Figure 8:
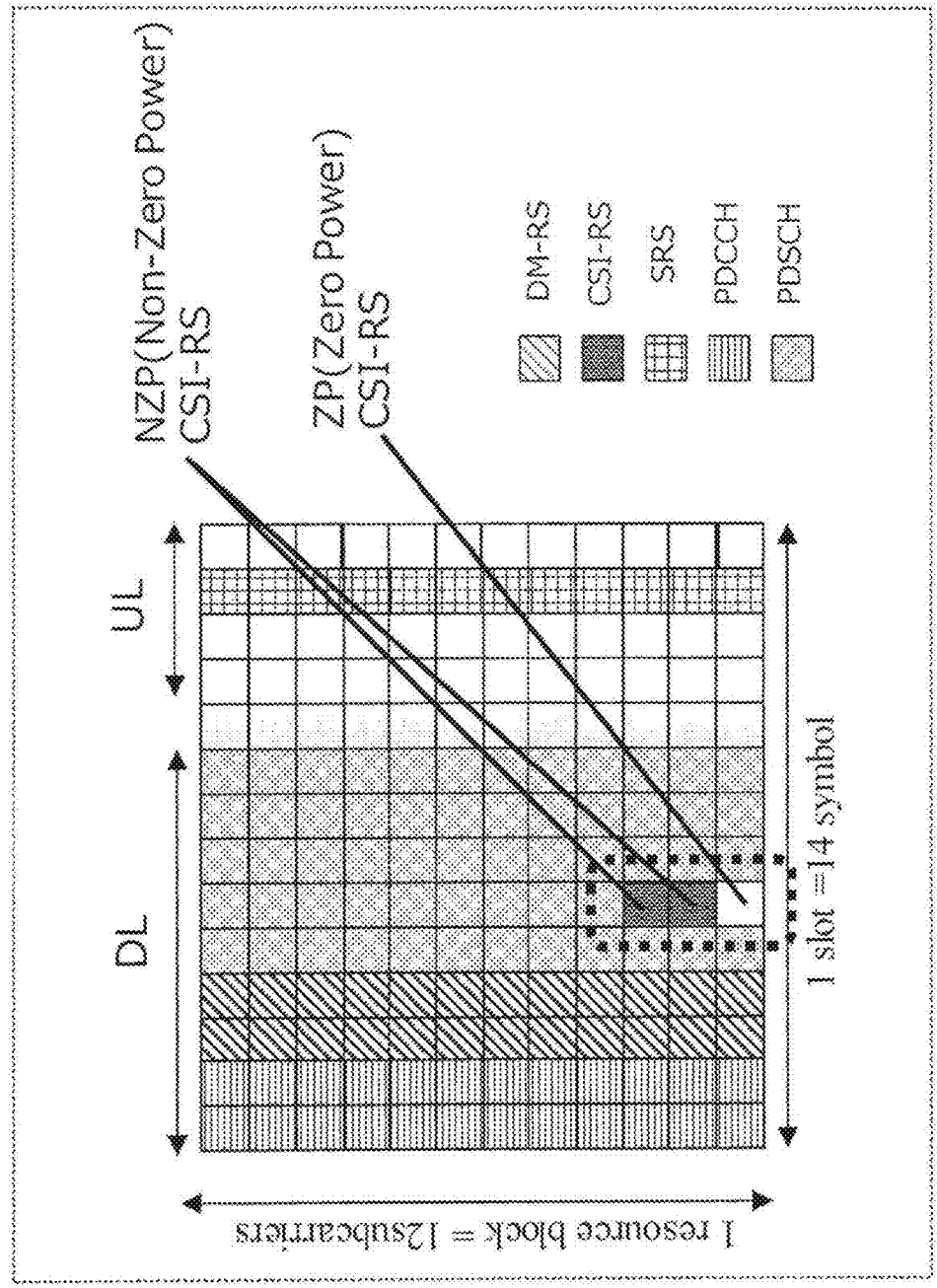
FIG. 8 is a diagram illustrating an example of a frame format according to the first exemplary embodiment.

FIG. 8 is a diagram illustrating an example of a frame format used in base station 100 and terminal 200. As illustrated in FIG. 8, the resource related to the CSI-RS allocation may include a resource for no allocation of transmission power, that is, muting of the CSI-RS (for example, referred to as a "zero power CSI-RS (ZP-CSI-RS)" or a "ZP-CSI-RS resource") and a resource for allocation of transmission power (for example, referred to as a "non-zero power CSI-RS (NZP-CSI-RS)" or an "NZP-CSI-RS resource").

Figure 9:
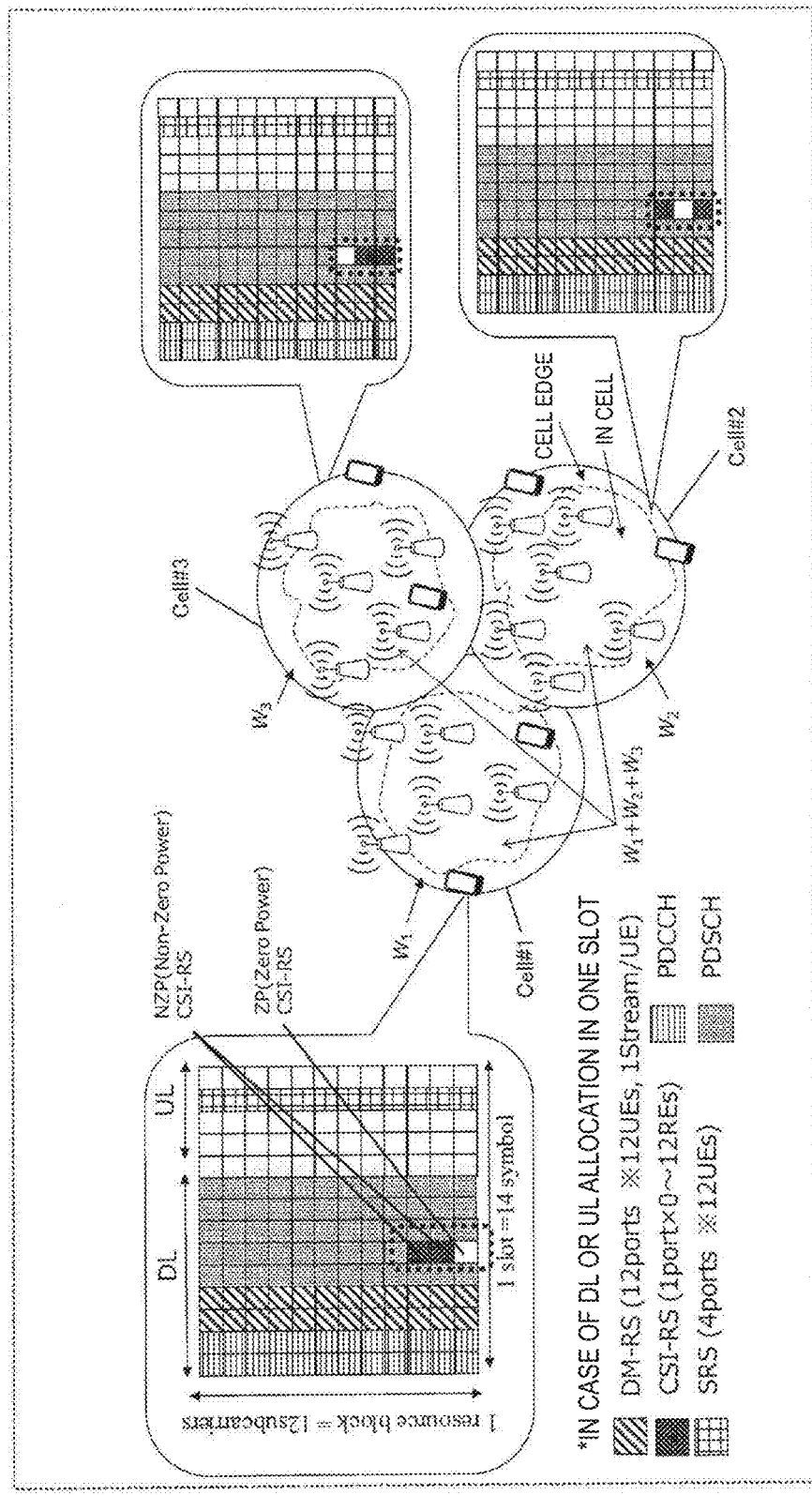
FIG. 9 is a diagram illustrating an example of reference signal resource allocation according to the first exemplary embodiment.

FIG. 9 is a diagram illustrating an example the CSI-RS resource allocation using the frame format illustrated in FIG. 8. As illustrated in FIG. 9, the position of ZP-CSI-RS allocation resource (for example, the position of resource element (RE)) may differ between adjacent cells. As illustrated in FIG. 9, the position of the ZP-CSI-RS resource in one cell may be identical to the positions of the NZP-CSI-RS resources in other cells. Further, the ZP-CSI-RS resource allocation and the NZP-CSI-RS resource allocation may be common among the plurality of distributed antennas in one cell.

In the ZP-CSI-RS resource in the cell (in other words, the NZP-CSI-RS resources in the other cells), terminal 200 may measure interference power from the other cells. As an example, terminal 200 in cell #1 illustrated in FIG. 9 may measure interference power from the other cells (for example, cell #2 and cell #3) in the ZP-CSI-RS resource in cell #1. The measurement of the interference power in the ZP-CSI-RS resource in each cell can improve measurement accuracy of interference power in terminal 200.

In FIG. 7, terminal 200 notifies base station 100 of information about the measured interference power (for example, DL interference power) (S104).

Base station 100 performs classification into the intra-cell terminal and the cell edge terminal (for example, also referred to as user classification) (S105). Base station 100 may perform the user classification based on the information about the interference power notified from each terminal 200. Base station 100 may classify a default numbers (or a default ratio) of terminals 200 with higher interference power as the cell edge terminals, and the other terminals as the intra-cell terminals. Alternatively, base station 100 may classify terminals with interference power larger than or equal to a default threshold as the cell edge terminals, and terminals with interference power smaller than the threshold as the intra-cell terminals.

Base station 100 then may perform intra-cell interference coordination on the intra-cell terminal (S106).

Base station 100 may further perform the inter-cell interference coordination on the cell edge terminal (S107 to S111). In the inter-cell interference coordination, for example, in order to select a communication band (for example, a partial band) to be used in the FFR in each base station (or each cell), reception quality measurement may be individually performed on each partial band.

In the inter-cell interference coordination, base station 100 may select a distributed antenna (for example, referred to as a distributed antenna for the cell edge terminal) to be allocated to the cell edge terminal (S107). Base station 100 may set a distributed antenna located near the cell edge terminal as the distributed antenna for the cell edge terminal, based on the position information about the cell edge terminal.

Base station 100 transmits, for example, a DL-RS (for example, a CSI-RS) from the distributed antenna for the cell edge terminal to terminal 200 (S108-1). For example, in addition to the CSI-RS from base station 10, terminal 200 may receive a DL-RS (for example, a CSI-RS) from a base station (for example, a distributed antenna) of another cell (S108-2). Terminal 200 measures, for example, a downlink interference level (for example, interference power) in each partial band (S109). Terminal 200 may measure the interference power based on the CSI-RS transmitted from each cell (for example, average interference power).

Here, base station 100 may allocate the NZP-CSI-RS to each partial band in the distributed antenna for the cell edge terminal. In other words, base station 100 does not need to allocate the NZP-CSI-RS to the distributed antenna different from the distributed antenna for the cell edge terminal. In addition, the NZP-CSI-RS for measuring the individual reception quality in the partial bands may be different in resource from the CSI-RS used for the user classification described above.

Figure 10:
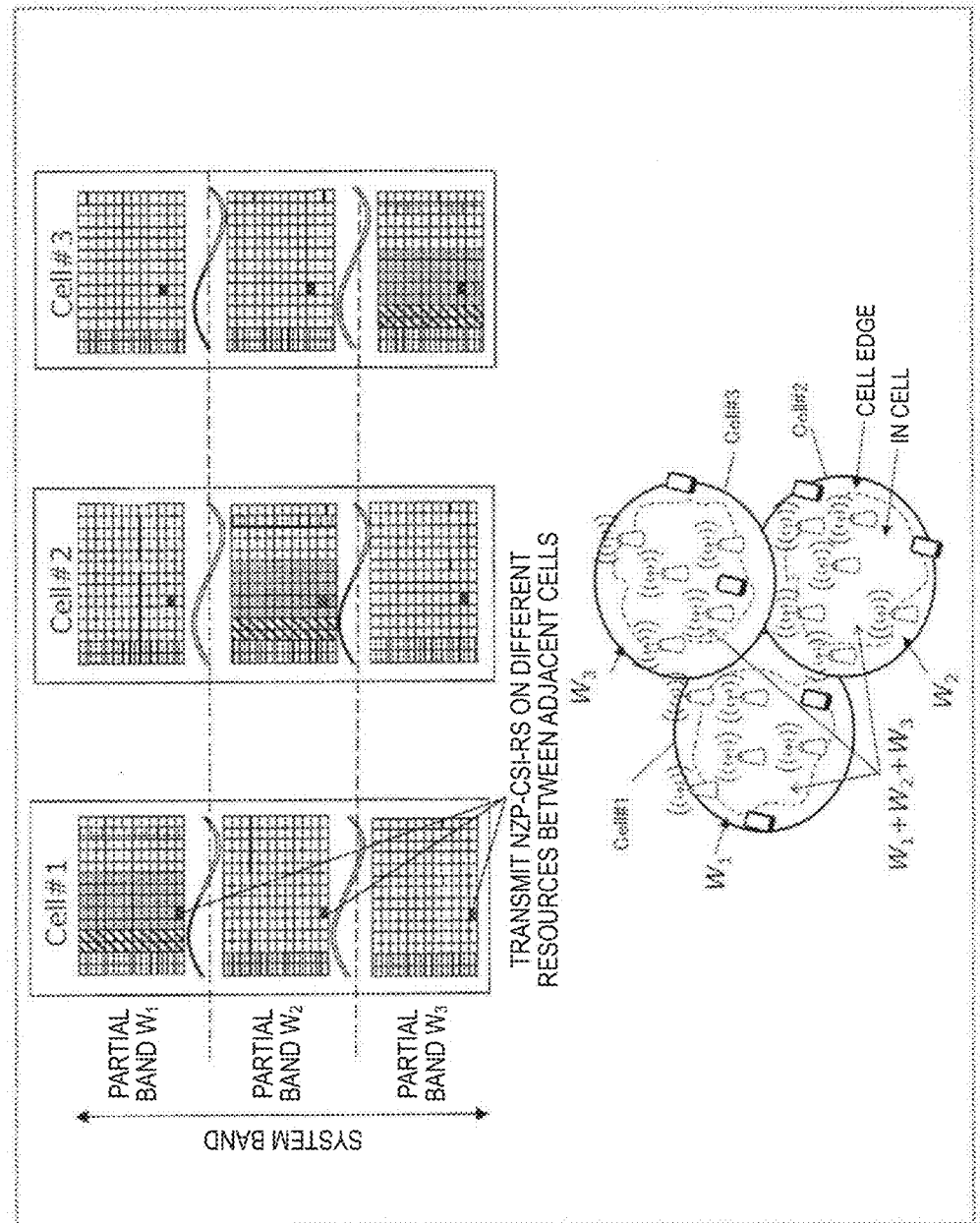
FIG. 10 is a diagram illustrating an example of reference signal resource allocation according to the first exemplary embodiment.

FIG. 10 is a diagram illustrating an example of CSI-RS resource allocation in the distributed antenna for the cell edge terminal. In the example of FIG. 10, in the FFR, partial bands $W_1$, $W_2$, and $W_3$ are allocated to each of adjacent cell #1, cell #2, and cell #3. As illustrated in FIG. 10, the NZP-CSI-RS resource may be set at different positions (for example, different REs) among the adjacent cells. As a result, a signal (for example, a data channel) of another cell is allocated in the NZP-CSI-RS resource in each cell. This can improve measurement accuracy of interference power by terminal 200 in the NZP-CSI-RS resource in each cell.

Further, in FIG. 7, terminal 200 may measure interference power and an SIR between the respective distributed antennas based on the CSI-RS (S109).

Note that terminal 200 may measure the reception quality (for example, at least one of the interference power and the SIR) using the ZP-CSI-RS instead of the NZP-CSI-RS or both the ZP-CSI-RS and the NZP-CSI-RS. This can improve the measurement accuracy of the interference from other cells.

Terminal 200 notifies base station 100 of at least one of information about the measured interference power and information about the measured SIR (S110).

Base station 100 selects (in other words, sets or determines) a communication band (for example, a partial band) in which communication with terminal 200 is performed in each cell (S111). Base station 100 may determine the partial band allocated to each cell based on the interference power individually measured for the partial band. Base station 100 may determine a partial band with lower interference power (for example, the smallest partial band) among a plurality of partial bands in each cell as the partial band of the cell (hereinafter, referred to as the a "highest partial band").

Base station 100 may further select a partial band (hereinafter, referred to as an "additional partial band") individually set at the cell edge terminal in addition to the highest partial band individually set for each cell (S111). The allocation of the additional partial band can further increase the system capacity.

Note that, for selection of the additional partial band, an SIR based on the NZP-CSI-RS (in other words, a DL-RS different from the CSI-RS used in the user classification) used for the selection of the highest partial band may be used. Base station 100 may allocate, to the cell edge terminal, a partial band in which the SIR is larger than or equal to a default threshold among partial bands different from the highest partial band of each cell, as the additional partial band. In other words, base station 100 does not need to allocate, to the cell edge terminal, a partial band in which the SIR is smaller than the default threshold among partial bands different from the highest partial band of each cell, as the additional partial band.

In FIG. 7, base station 100 performs scheduling of terminal 200 (S112). Base station 100 may allocate a resource to each cell edge terminal based on the highest partial band of each cell and the additional partial band of each cell edge terminal. Base station 100 then may allocate a resource to the intra-cell terminal based on the intra-cell interference coordination.

Next, base station 100 and terminal 200 may execute cooperative transmission and reception (for example, MU-MIMO) processing (for example, in S113 to S125). In the cooperative transmission and reception, the reception quality may be measured for generating a transmission weight and a reception weight used for MU-MIMO transmission per cluster.

Base station 100 transmits the DL-RS to terminal 200 (S113-1). The DL-RS may be a CSI-RS defined in the 3GPP specification. In addition to the CSI-RS from base station 100, terminal 200 may receive a DL-RS (for example, a CSI-RS) from a base station (for example, a distributed antenna) of another cell (S113-2).

Terminal 200 measures, for example, a level of interference from another downlink cluster (for example, DL interference power) (S114). Further, terminal 200 performs channel estimation with respective base stations 100 (for example, respective distributed antennas) (S115). The measurement of the interference power and the channel estimation in terminal 200 may be based on the CSI-RS transmitted from each cell. Terminal 200 transmits, for example, channel information and information about the DL transmission weight such as interference power to base station 100 (S116).

Here, in the DL channel estimation (for example, the processing in S115), the NZP-CSI-RS resources may be orthogonal to each other between the distributed antennas in one cluster. As a result, terminal 200 can separate signals from the distributed antenna from each other in the cluster. On the other hand, NZP-CSI-RS resource may be shared among the distributed antennas in different clusters.

As described above, in the DL channel estimation, the reference signal (for example, NZP-CSI-RS used for channel estimation) resources in the cluster are orthogonal to each other, and the reference signal resource is shared between the clusters. As a result, the reference signal resources do not need to be orthogonal to each other among all the distributed antennas in the cell, and thus, the overhead caused by the reference signal can be reduced.

Note that the NZP-CSI-RS resources may be orthogonal to each other between clusters in which inter-cluster interference is likely to be great such as a case where the distance between clusters is shorter than or equal to a threshold. The NZP-CSI-RS resource may be a resource different from a resource used for selection of a partial band.

Figure 11:
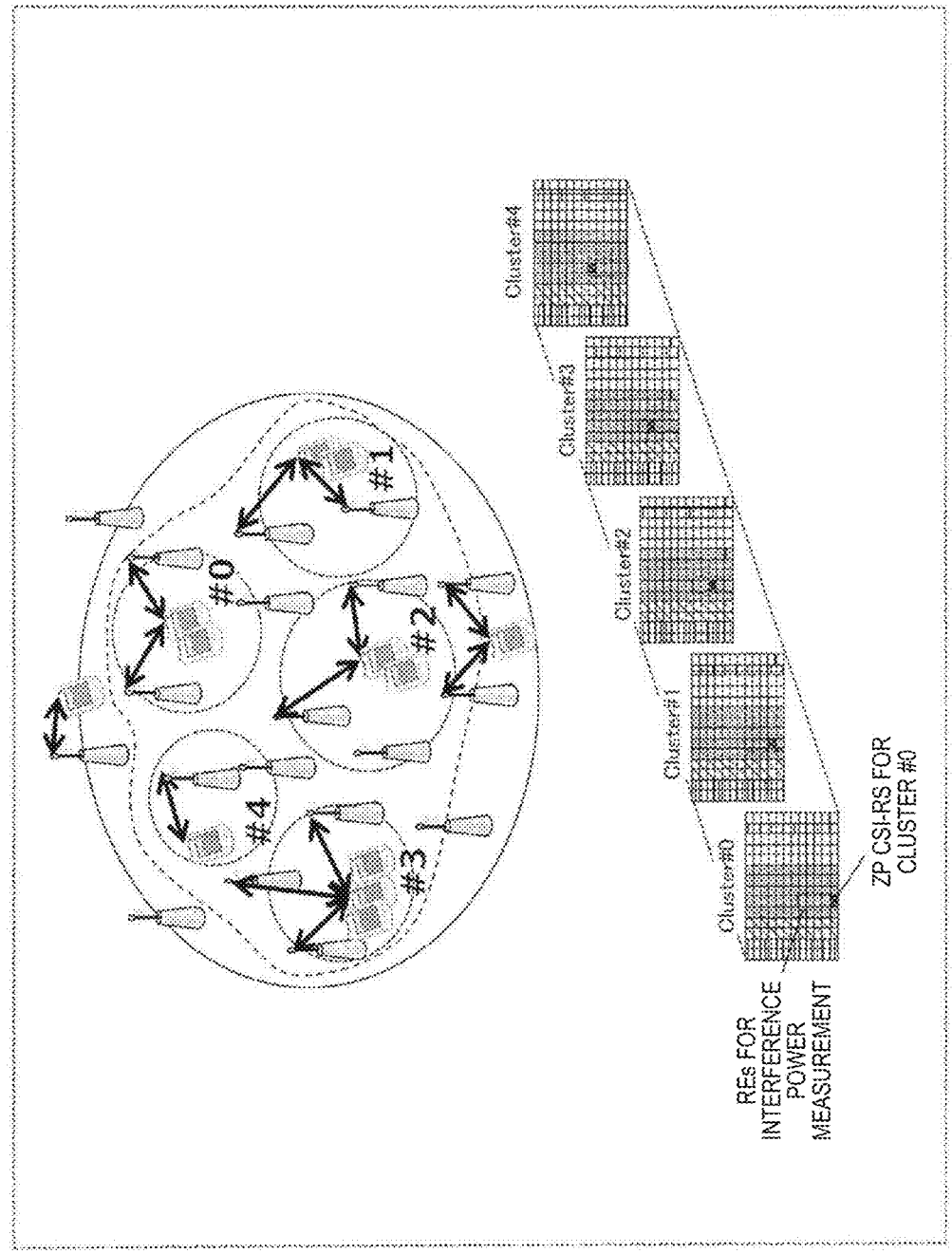
FIG. 11 is a diagram illustrating an example of reference signal resource allocation according to the first exemplary embodiment.

In the measurement of DL interference from the other clusters (for example, the processing in S114), as illustrated in FIG. 11, the ZP-CSI-RS resources may be orthogonal to each other among the distributed antennas in the clusters. This can improve, in the cluster set for terminal 200, the measurement accuracy of the interference power from the distributed antennas of the other clusters. On the other hand, the ZP-CSI-RS may be shared between the distributed antennas in one cluster.

As described above, in the DL interference measurement, the reference signal (for example, the ZP-CSI-RS to be used for the DL interference measurement) resources are orthogonal to each other among the distributed antennas between the clusters, and the reference signal resource is shared in one cluster. As a result, the reference signal resources do not need to be orthogonal to each other among all the distributed antennas in the cell. Thus, the overhead caused by the reference signal can be reduced.

In FIG. 7, base station 100 generates a DL transmission weight based on the information about the DL transmission weight transmitted from terminal 200 (S117). Base station 100 may generate the DL transmission weight in accordance with a minimum mean square error (MMSE) criterion.

Base station 100 transmits a reference signal for DL demodulation (for example, demodulation reference signal (DMRS)) (S118). Note that base station 100 may multiply the DMRS by the DL transmission weight.

Terminal 200 may perform channel estimation based on the DL DMRS (S119), and generate a DL reception weight based on the channel estimation value (S120). In addition, terminal 200 may generate a UL transmission weight based on the channel estimation value (S121).

Terminal 200 transmits a reference signal for UL demodulation (for example, a DMRS) (S122). Note that terminal 200 may multiply the DMRS by the UL transmission weight.

Base station 100 may measure a UL interference power (S123) and perform channel estimation (S124) based on the UL DMRS. Base station 100 may then generate a UL reception weight based on the UL interference power and the channel estimation value (S125). Base station 100 may generate the UL transmission weight according to, for example, the MMSE criterion.

As described above, in the present exemplary embodiment, base station 100 transmits the reference signal (for example, the CSI-RS) in the plurality of communication bands (for example, partial bands) using a part of the plurality of distributed antennas (for example, distributed antennas for the cell edge terminals). Base station 100 then determines which of the plurality of communication bands to allocate to terminal 200, based on the measurement result using the reference signal. Base station 100 may receive a measurement result (for example, information about the DL interference power) obtained by terminal 200 using the reference signals transmitted from the selected part of the distributed antennas, and determine a partial band for terminal 200 based on the received result.

As described above, in the selection of the partial band in the inter-cell interference coordination, the CSI-RS for measuring the individual reception quality in the partial band is transmitted from the distributed antenna for the cell edge terminal. As a result, the CSI-RS resource is not allocated to another distributed antenna different from the distributed antenna for the cell edge terminal. This can reduce the overhead caused by the reference signal.

Further, in the inter-cell interference coordination, base station 100 autonomously selects a partial band on information about interference power notified from terminal 200 in the cell. As a result, base station 100 does not need to exchange interference information about a partial band between base stations (or between cells). This can prevent an increase in traffic between the base stations.

In addition, in the present exemplary embodiment, base station 100 controls the generation of the transmission weight based on the result of measurement using a first reference signal and a second reference signal. Resources orthogonal to each other among antenna groups are allocated to the second reference signal. Resources orthogonal to each other within each of the antenna groups are allocated to the first reference signal. The antenna groups form clusters in a cell. For example, the measurement result may include a channel estimation value based on the first reference signal and interference power for terminal 200 based on the second reference signal. In the present exemplary embodiment, the first reference signal may be a downlink-reference signal (for example, an NZP-CSI-RS), and the second reference signal may be a downlink-reference signal (for example, a ZP-CSI-RS).

As described above, in the generation of the transmission weight in cooperative transmission and reception, the CSI-RS resources for measuring the channel estimation value are orthogonal to each other in the cluster and the CSI-RS resources are shared between the clusters. Alternatively, the CSI-RS resources for measuring the interference power are orthogonal to each other between the clusters and the CSI-RS resources are shared in the cluster. As a result, all the reference signal resources in the cell do not need to be orthogonal to each other. This can reduce the overhead caused by the reference signal.

Second Exemplary Embodiment

The configurations of the base station and the terminal according to the present exemplary embodiment are similar to the configurations according to the first exemplary embodiment.

In the first exemplary embodiment, the reception quality measurement using the CSI-RS which is the downlink reference signal (DL-RS) has been described. The information about the reception quality is fed from terminal 200 to base station 100 in the first exemplary embodiment.

The present exemplary embodiment refers to a case where reception quality measurement using an uplink reference signal (UL-RS) is performed instead of DL reception quality measurement performed for partial band selection in inter-cell interference coordination and for generation of a DL transmission weight in distributed MIMO cooperative transmission and reception. The DL reception quality such as interference from other cells may be substituted by UL reception quality using a sounding reference signal (SRS) which is an uplink reference signal (UL-RS) by using reciprocity of a propagation path based on time division duplex (TDD). As a result, since the reception quality is measured at base station 100, the information about the reception quality does not need to be fed back, and thus the amount of signaling can be reduced.

In the present exemplary embodiment, in base station 100 illustrated in FIG. 5, as in the first exemplary embodiment, controller 101 may determine the information about setting of an uplink reference signal in addition to the information about setting of a downlink reference signal.

Further, in the first exemplary embodiment, controller 101 performs inter-cell interference coordination based on the information about the reception quality fed back from terminal 200. On the other hand, in the present exemplary embodiment, controller 101 may perform the inter-cell interference coordination based on a measurement result (for example, an output from measurement unit 103) of the reception quality using the reference signal transmitted from terminal 200. Further, in the first exemplary embodiment, controller 101 generates the downlink transmission weight based on the information about the reception quality fed back from terminal 200. On the other hand, in the present exemplary embodiment, controller 101 may generate the downlink transmission weight based on a measurement result (for example, an output from measurement unit 103) of the reception quality using the reference signal transmitted from terminal 200.

Measurement unit 103 may, in addition to the operation in the first exemplary embodiment, measure reception quality (for example, interference power or channel estimation value) to be used for generating a downlink transmission weight, based on the reference signal transmitted from terminal 200.

In the present exemplary embodiment, measurement unit 203 does not need to measure the reception quality to be used for the inter-cell interference coordination and the reception quality to be used for generating the downlink transmission weight in terminal 200 illustrated in FIG. 6. In other words, control information to be transmitted from communicator 202 may not include the information about the reception quality such as channel information, interference power, or an SIR.

Figure 12:
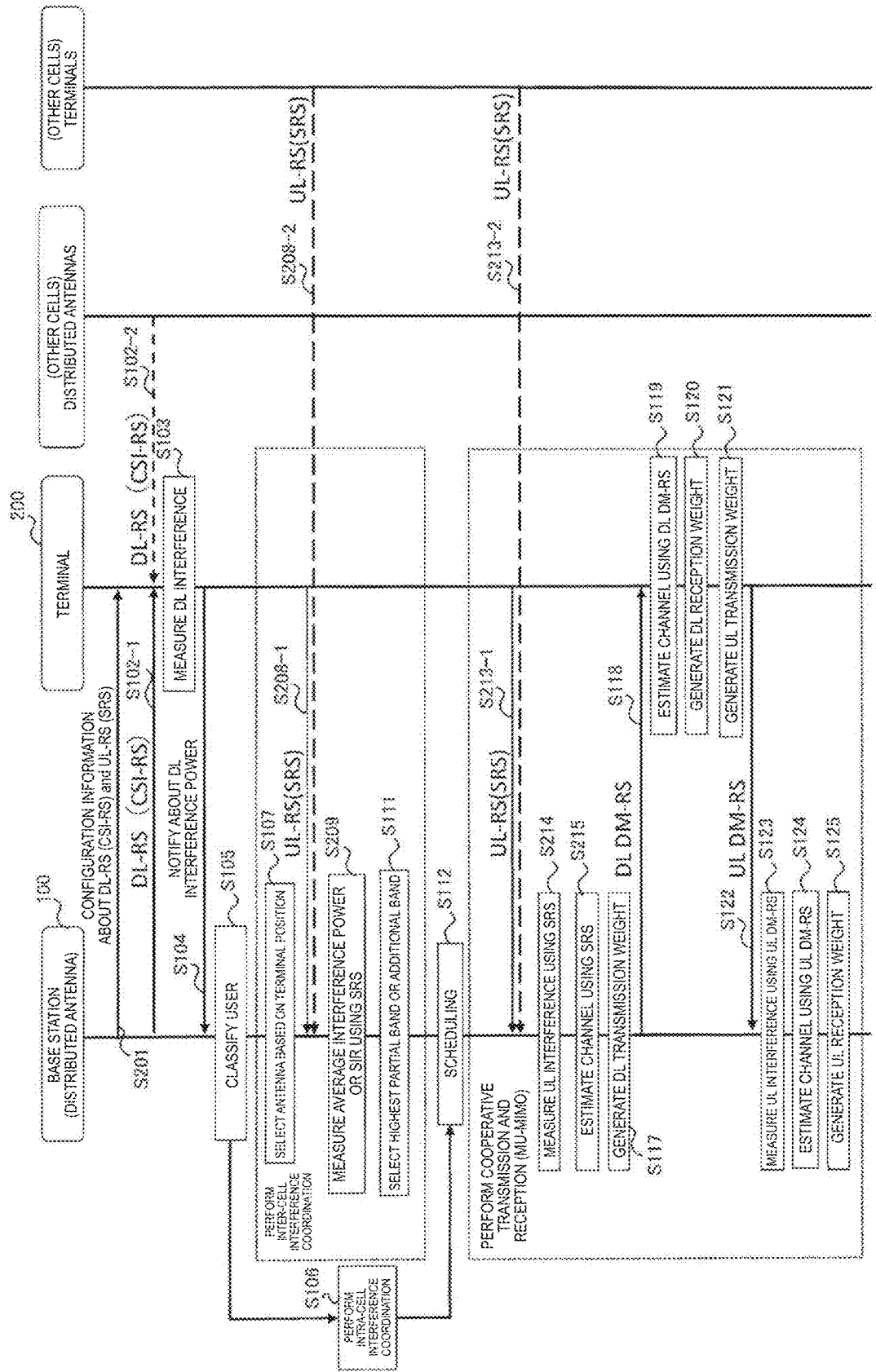
FIG. 12 is a sequence diagram illustrating an operation example of a base station and a terminal according to a second exemplary embodiment.

FIG. 12 is a sequence diagram illustrating an operation example of base station 100 (for example, distributed antenna) and terminal 200. Note that in FIG. 12, the same reference numbers are assigned to operations similar to those in FIG. 7.

In FIG. 12, base station 100 transmits, for example, information about setting of a DL-RS and information about setting of a UL-RS to terminal 200 (S201). The setting information about the DL-RS and the UL-RS may be given (or set) from base station 100 to terminal 200 by higher layer signaling. For example, the DL-RS may be a CSI-RS, and the UL-RS may be an SRS.

In addition, in the inter-cell interference coordination, as in the first exemplary embodiment, the reception quality measurement may be performed for each partial band. In the present exemplary embodiment, a partial band for the inter-cell interference coordination may be selected based on the interference power individually measured for each partial band. In addition, the interference power may be measured by using SRSs from terminals in the other cells received by a distributed antenna for a cell edge terminal.

Terminal 200 transmits, for example, UL-RS (for example, SRS) (S208-1) in the inter-cell interference coordination. In addition to the SRS from terminal 200, base station 100 may receive UL-RSs (for example, SRSs) from terminals of the other cells (S208-2).

Base station 100 measures, for example, an uplink interference level (for example, interference power) in each partial band (S209). Base station 100 may receive the SRS transmitted from each terminal in the distributed antenna allocated for the cell edge terminal, and measure the interference power (for example, average interference power) based on the received SRS.

Here, in the measurement of the interference power, since the SRS from terminal 200 in the cell corresponding to base station 100 is a known reference signal, base station 100 can cancel the SRS from terminal 200. Therefore, base station 100 may exclude the SRS from terminal 200 in the cell of base station 100, which is received simultaneously with the SRSs from terminals in the other cells. Alternatively, base station 100 may exclude the SRS from terminal 200 in the cell by not scheduling the SRS for terminal 200 in the cell during the interference power measurement. This can improve, in base station 100, measurement accuracy of the interference power based on the SRSs from the terminals of the other cells.

Base station 100 may further measure an SIR with respect to the cell edge terminals based on the SRS.

Figure 13:
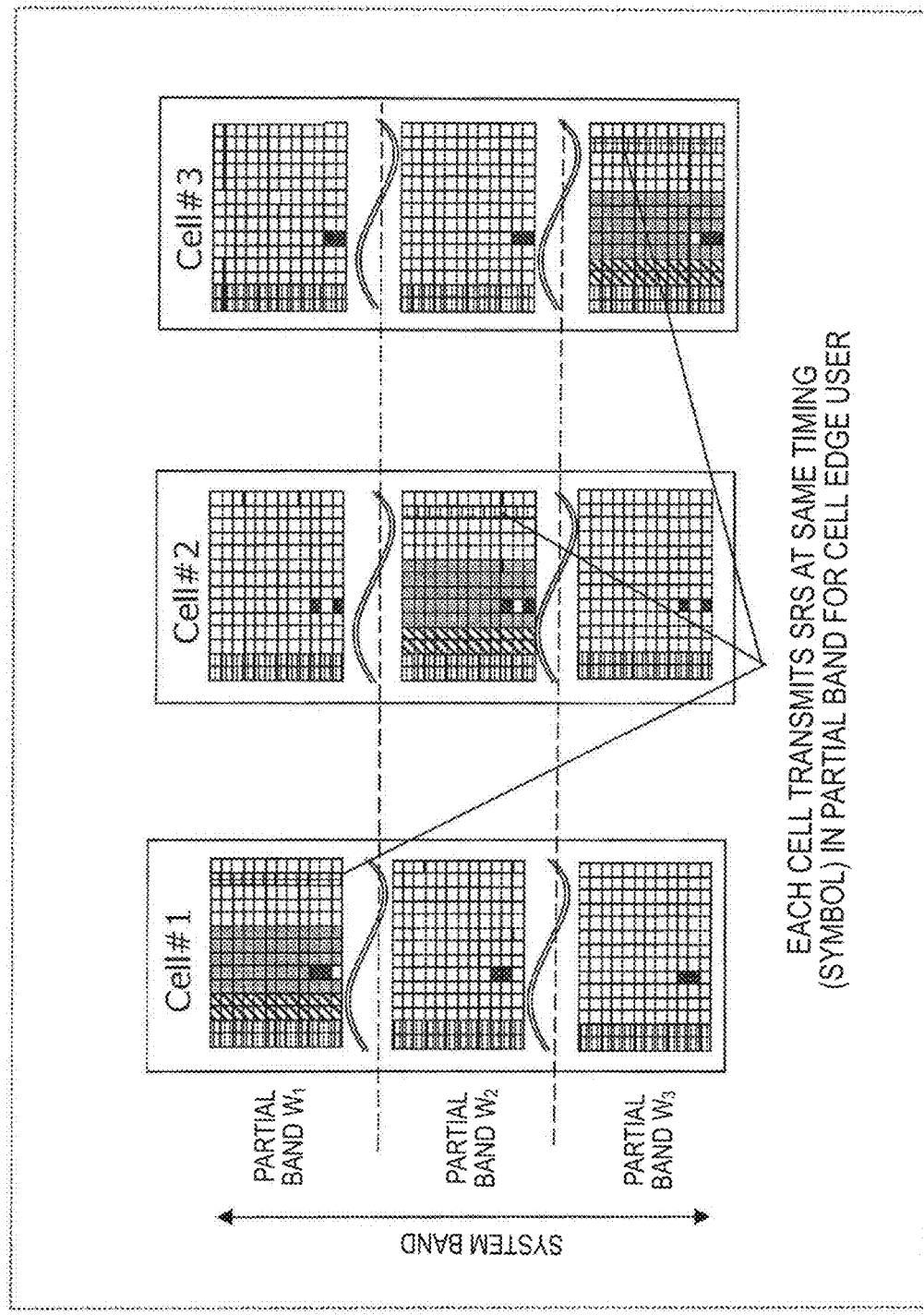
FIG. 13 is a diagram illustrating an example of reference signal resource allocation according to the second exemplary embodiment.

FIG. 13 is a diagram illustrating an example of SRS resource allocation. In the example of FIG. 13, in an FFR, partial bands $W_1$, $W_2$, and $W_3$ are allocated to each of adjacent cell #1, cell #2, and cell #3. As illustrated in FIG. 13, the SRS may be transmitted in a partial band allocated to the cell edge terminal of each cell, and does not need to be transmitted in partial bands different from the partial band in which the allocation is performed for the cell edge terminal of each cell.

In FIG. 13, base station 100 of cell #1 may measure the interference power of partial band $W_2$ and partial band $W_3$ using the SRSs transmitted from the terminals of cell #2 and cell #3. Further, base station 100 of cell #1 may measure the interference power of partial band $W_1$ by excluding the SRS transmitted from terminal 200 of cell #1. Then, base station 100 of cell #1 may set (or reset) a partial band (for example, the highest partial band) allocated to the cell edge terminal of cell #1, based on the interference power of each partial band.

Further, base station 100 of cell #1 may determine an additional partial band for the cell edge terminal in addition to the highest partial band. For the setting of the additional partial band, the SIR measured for each partial band using the SRS may be used.

Each partial band may be set for cell #2 and cell #3 similarly to cell #1.

In such a manner, in the present exemplary embodiment, base station 100 may estimate the DL reception quality based on the uplink reception quality based on the SRS transmitted from terminal 200 and select the partial band to be set for the cell edge terminal of each cell. As a result, transmission of the DL-RS by base station 100 and measurement and notification of the reception quality in terminal 200 do not need to be performed. Thus, processing related to the selection of the partial bands can be reduced.

Next, base station 100 and terminal 200 may execute cooperative transmission and reception (for example, MU-MIMO) processing. In the cooperative transmission and reception, the reception quality may be measured for generating a transmission weight and a reception weight used for MU-MIMO transmission per cluster.

In the present exemplary embodiment, the DL transmission weight in the cooperative transmission and reception may be generated based on, for example, a channel estimation value and interference power measured by base station 100 using the SRS transmitted from the terminal of each cell.

For example, terminal 200 transmits a UL-RS (for example, an SRS) (S213-1). In addition to the SRS from terminal 200, base station 100 may receive a UL-RS (for example, an SRS) from terminals of the other cells (S213-2). The SRS resource may be different from the SRS resource to be used for selecting a partial band.

Base station 100 measures a level of interference from another uplink cluster (for example, interference power) (S214). Further, base station 100 performs channel estimation between the distributed antennas and terminals 200 (S215). The interference power measurement and the channel estimation in base station 100 may be based on SRSs transmitted from the terminals. In this manner, base station 100 may estimate the DL reception quality by measuring the UL reception quality.

In the DL channel estimation (for example, the processing in S215), the SRS resources may be orthogonal to each other between the terminals in one cluster. The SRSs may be orthogonal, for example, by codes. As a result, base station 100 can separate signals from the terminals in the cluster. On the other hand, the SRS resource (for example, a code to be used for the SRS) may be shared among terminals in different clusters.

In this way, in the DL channel estimation, the reference signal resources are orthogonal to each other at the terminals in the cluster, and the reference signal resource is shared among the terminals in the clusters. As a result, the reference signal resources do not need to be orthogonal to each other among all the distributed antennas in the cell, and thus, the overhead caused by the reference signal can be reduced.

Note that the SRS resources may be orthogonal to each other between the terminals in clusters in a case where inter-cluster interference is likely to be great such as a case where the distance between clusters is shorter than or equal to a threshold.

In the measurement of UL interference from the other clusters of DL (for example, the processing in S214), the SRS resources may be orthogonal to each other among the terminals in the clusters. The SRS resource may be different from the SRS resource to be used for the channel estimation. This can improve, in base station 100, measurement accuracy of interference power at terminal 200 from the other clusters. On the other hand, the SRS may be shared between the terminals in one cluster.

In this way, in the DL interference measurement, the reference signal (for example, the SRS) resources are orthogonal to each other among the terminals in the clusters, and the reference signal resource is shared at the terminals in the cluster. As a result, the reference signal resources do not need to be orthogonal to each other among all the terminals in the cell, and thus, the overhead caused by the reference signal can be reduced.

In such a manner, in the present exemplary embodiment, base station 100 may estimate the DL reception quality based on the uplink reception quality based on the SRS transmitted from terminal 200 and generate the DL transmission weight. As a result, transmission of the DL-RS by base station 100 and measurement and notification of the reception quality in terminal 200 do not need to be performed. Thus, processing related to the selection of the partial bands can be reduced.

Note that high-accurate measurement may not be performed to measure interference power from the other cells. Therefore, for example, the processing load on base station 100 may be reduced by omitting the measurement of interference power from the other cells.

The operation example of base station 100 and terminal 200 according to the present exemplary embodiment has been described above.

In the present exemplary embodiment, in the selection of the partial bands in the inter-cell interference coordination, base station 100 may receive the reference signal (for example, the SRS) in the plurality of communication bands (for example, partial bands) using a part of the plurality of distributed antennas (for example, distributed antennas for the cell edge terminals). Base station 100 then may determine which of the plurality of communication bands to allocate to terminal 200, based on a result of measurement using the reference signal. As a result, since the information about the reception quality does not need to be fed back from terminal 200 to base station 100, the overhead in the uplink can be reduced.

Further, in the inter-cell interference coordination, base station 100 autonomously selects a partial band based on the interference power measured based on an uplink reference signal. As a result, base station 100 does not need to exchange interference information about a partial band between base stations (or between cells). This can prevent an increase in traffic between the base stations.

Further, in the present exemplary embodiment, base station 100 performs channel estimation based on the SRS to which resources orthogonal to each other in the cluster (in other words, an antenna group) in the cell are allocated. Base station 100 measures the interference based on the SRS to which resources orthogonal to each other among the plurality of clusters. Base station 100 then controls the generation of the transmission weight based on the results of the channel estimation and the interference measurement.

In such a manner, in the generation of the transmission weight in the cooperative transmission and reception, the SRS resources for measuring the channel estimation value are orthogonal to each other in the cluster and the SRS resource is shared between the clusters. Alternatively, the SRS resources for measuring the interference power are orthogonal to each other between the clusters and the SRS resource is shared in the cluster. As a result, all the reference signal resources in the cell do not need to be orthogonal, and thus the overhead caused by the reference signal can be reduced.

Third Exemplary Embodiment

The configurations of the base station and the terminal according to the present exemplary embodiment are similar to the configurations according to the first exemplary embodiment.

The second exemplary embodiment refers to the case where the SRS that is the UL reference signal is used for measurement of the DL interference power (or channel estimation) used for the generation of the DL transmission weight in the distributed MIMO cooperative transmission and reception. In this case, an error may occur between the UL interference power to be measured and the DL interference power with terminal 200. When an error occurs, the generation accuracy of a transmission weight may be reduced.

Therefore, the present exemplary embodiment refers to a case where the method using the CSI-RS that is the DL reference signal in the first exemplary embodiment is applied to the measurement of the interference power from the other clusters during the generation of a transmission weight in the second exemplary embodiment. This method can improve measurement accuracy of interference power in the distributed MIMO cooperative transmission and reception.

In the present exemplary embodiment, processing related to inter-cell interference coordination in controller 101, communicator 102, and measurement unit 103 of base station 100 illustrated in FIG. 5 may be similar to the processing in the second exemplary embodiment. Further, processing related to generation of transmission and reception weights in controller 101, communicator 102, and measurement unit 103 of base station 100 illustrated in FIG. 5 may be similar to the processing in the first exemplary embodiment.

In the present exemplary embodiment, processing related to the inter-cell interference coordination in controller 201, communicator 202, and measurement unit 203 of terminal 200 illustrated in FIG. 6 may be similar to the processing in the second exemplary embodiment. Further, processing related to generation of transmission and reception weights in controller 201, communicator 202, and measurement unit 203 of terminal 200 illustrated in FIG. 6 may be similar to the processing in the first exemplary embodiment.

Figure 14:
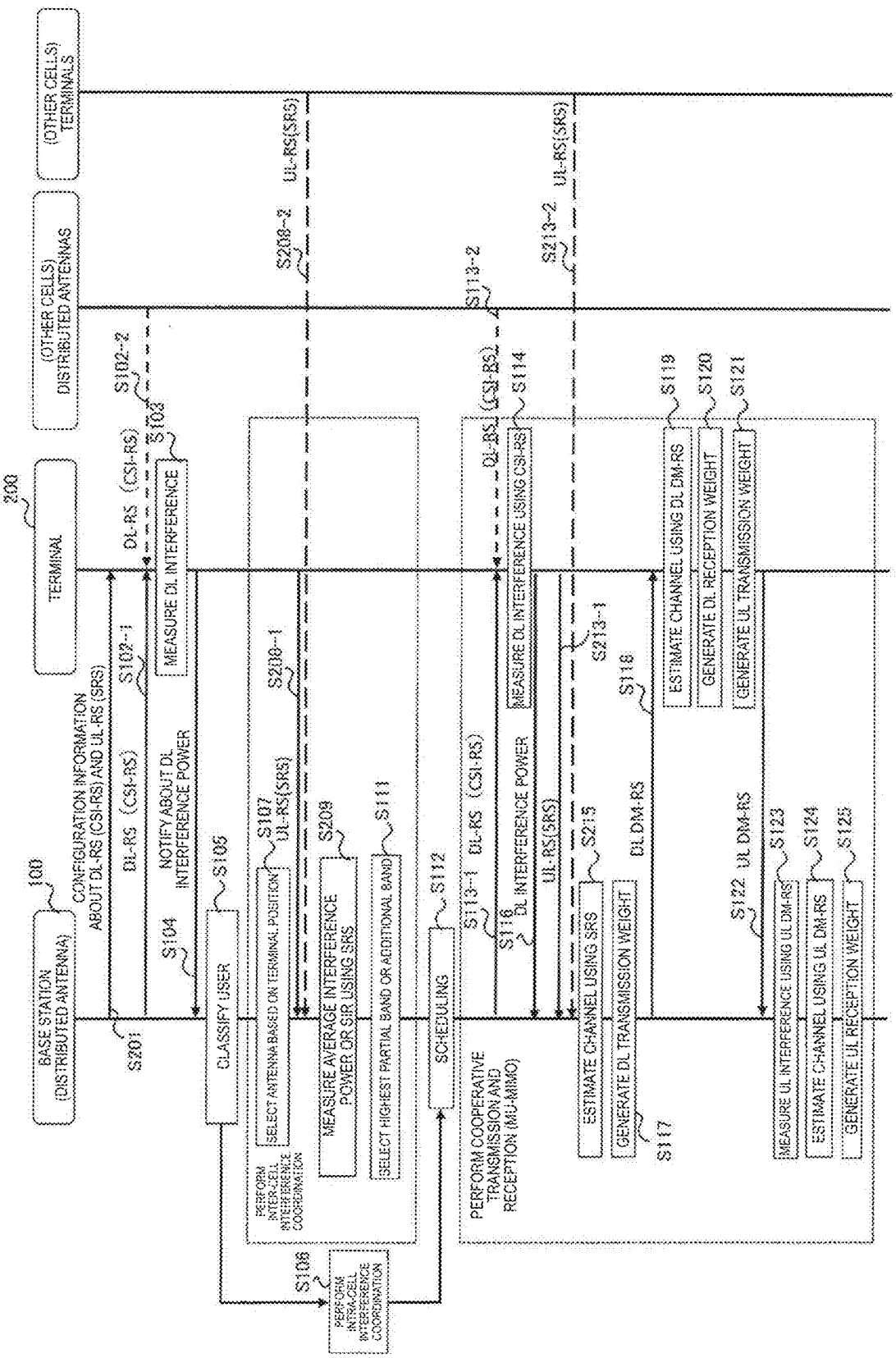
FIG. 14 is a sequence diagram illustrating an operation example of a base station and a terminal according to a third exemplary embodiment.

FIG. 14 is a sequence diagram illustrating an operation example of base station 100 (for example, a distributed antennas) and terminal 200. Note that identical reference symbols are given to operations in FIG. 14 similar to those in the first (FIG. 7) and second (FIG. 12) exemplary embodiments.

As illustrated in FIG. 14, in the inter-cell interference coordination processing, for example, as in the second exemplary embodiment, partial bands may be selected based on interference power measurement using the UL-RS (for example, the SRS).

Further, as illustrated in FIG. 14, in the cooperative transmission and reception control processing, a DL interference power may be measured based on a DL-RS (for example, a CSI-RS) as in the first exemplary embodiment. A DL channel estimation may be performed based on the UL-RS (SRS) as in the second exemplary embodiment.

For example, in the cooperative transmission and reception control, a period (or frequency) of the interference power measurement may be shorter than an update period (or an update frequency) of the DL transmission weight. Therefore, for example, a feedback amount of information about interference power from terminal 200 to base station 100 due to the CSI-RS measurement can be reduced as compared with the amount in the first exemplary embodiment.

As described above, in the cooperative transmission and reception control (for example, generation of the DL transmission weight), for example, an uplink reference signal is used as the reference signal for the channel estimation, and a downlink reference signal is used as the reference signal for the interference power measurement. As a result, base station 100 can generate the DL transmission weight based on the interference power according to the actual situation of a downlink. Thus, the generation accuracy of the transmission weight can be improved.

Base station 100 may estimate the DL interference power by acquiring in advance the information about the positions of the distributed antennas including the other cells and calculating a path loss based on the position information about each terminal 200 in the cell corresponding to base station 100 and the position information about the distributed antennas. This can omit the DL interference power measurement using the DL CSI-RS, and thus can reduce the overhead caused by the CSI-RS.

In the present exemplary embodiment, the DL-RS (for example, the CSI-RS) and the UL-RS (for example, the SRS) may be allocated within one slot as illustrated in FIG.

8, or may be allocated to different slots. Further, the DL-RS and the UL-RS may be different in a transmission period from each other.

Fourth Exemplary Embodiment

The configurations of the base station and the terminal according to the present exemplary embodiment are similar to the configurations according to the first exemplary embodiment.

The first to third exemplary embodiments refer to the example in which the DL transmission weight is generated first and then the UL transmission weight is generated in the generation of the transmission weight in the distributed MIMO cooperative transmission and reception.

The present exemplary embodiment refers to an example in which the UL transmission weight is generated first and then the DL transmission weight is generated in the generation of the transmission weight in the distributed MIMO cooperative transmission and reception.

In the present exemplary embodiment, processing related to inter-cell interference coordination in controller 101, communicator 102, and measurement unit 103 of base station 100 illustrated in FIG. 5 may be similar to the processing in the first or second exemplary embodiment. Further, processing related to generation of transmission and reception weights in controller 101, communicator 102, and measurement unit 103 of base station 100 illustrated in FIG. 5 may be different in order from the processing in the first exemplary embodiment. For example, controller 101 may generate the UL reception weight first, and then generate the DL transmission weight.

In the present exemplary embodiment, processing related to inter-cell interference coordination in controller 201, communicator 202, and measurement unit 203 of terminal 200 illustrated in FIG. 6 may be similar to the processing in the first or second exemplary embodiment. Further, the processing related to the generation of transmission and reception weights in controller 201, communicator 202, and measurement unit 203 of terminal 200 illustrated in FIG. 6 may be different in order from the processing in the first exemplary embodiment. For example, controller 201 may generate the UL transmission weight first, and then generate the DL reception weight.

Figure 15:
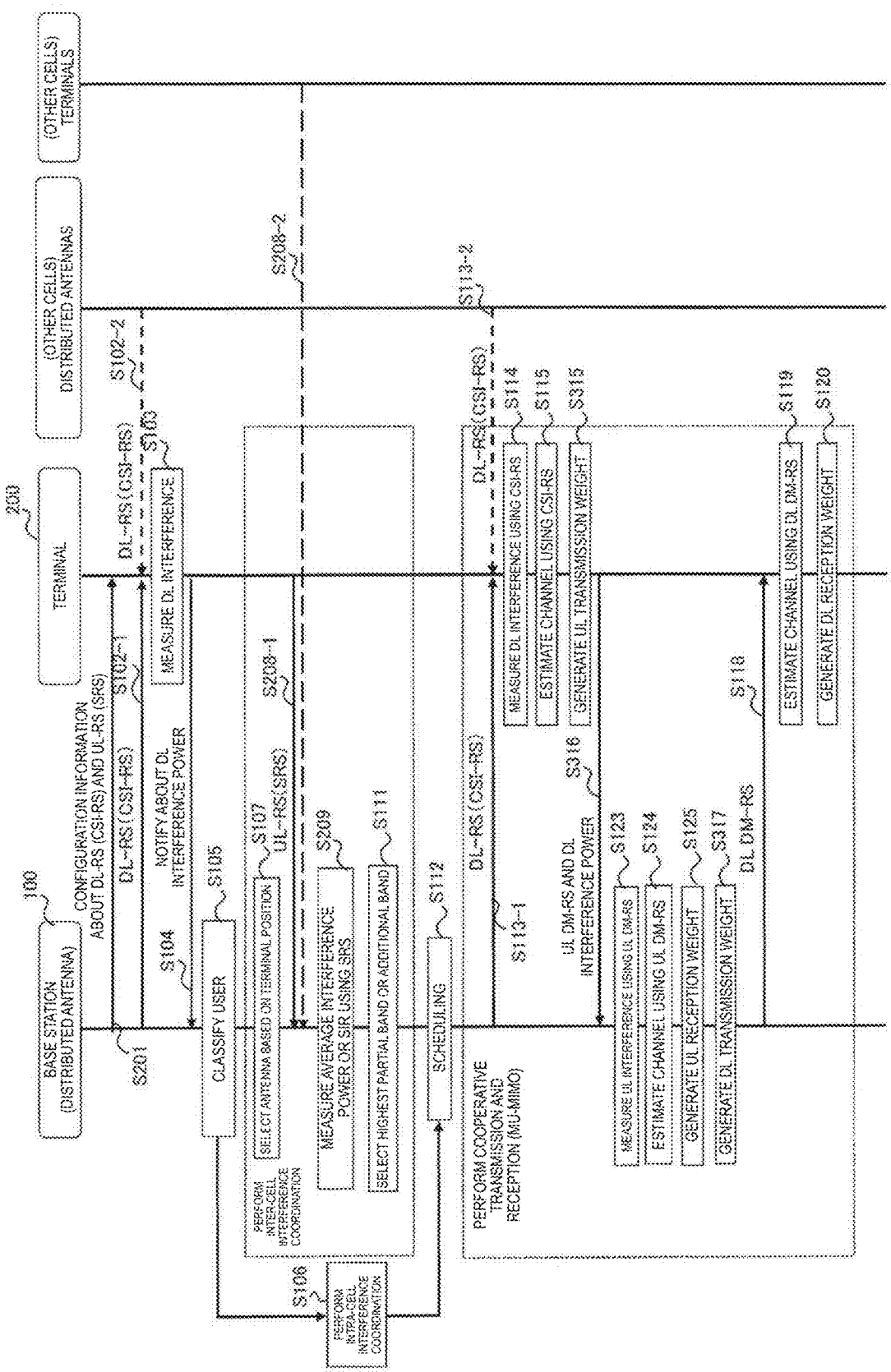
FIG. 15 is a sequence diagram illustrating an operation example of a base station and a terminal according to a fourth exemplary embodiment.

FIG. 15 is a sequence diagram illustrating an operation example of base station 100 (for example, distributed antennas) and terminal 200. Note that identical reference symbols are given to operations in FIG. 15 similar to those in the first (FIG. 7) and second (FIG. 12) exemplary embodiments.

For example, in the inter-cell interference coordination illustrated in FIG. 15, base station 100 and terminal 200 may perform the operation identical to that in second exemplary embodiment. Note that the inter-cell interference coordination is not limited thereto, and for example, the inter-cell interference coordination in the first exemplary embodiment may be applied.

In the cooperative transmission and reception control illustrated in FIG. 15, for example, as in the first and third exemplary embodiments, base station 100 transmits a DL-RS (for example, a CSI-RS) (S113-1). Terminal 200 may measure the DL interference power using the CSI-RS (for example, a ZP-CSI-RS) (S114), and perform channel estimation using a CSI-RS (for example, an NZP-CSI-RS) (S115). In addition, terminal 200 may generate the UL transmission weight based on at least a channel estimation value (S315).

Terminal 200 transmits information about the DL interference power and an UL-RS (for example, a DMRS) to base station 100 (S316). Note that the UL-RS may be multiplied by the UL transmission weight.

Base station 100 may measure UL interference power (S123) and perform channel estimation (S124) using a UL DM-RS. Base station 100 may further generate a UL reception weight according to an MMSE criterion (S125). Note that the UL interference power to be used when the UL reception weight is generated in base station 100 may be calculated based on an UL-RS (SRS) transmitted from terminal 200.

Further, base station 100 generates the DL transmission weight based on the DL interference power information received from terminal 200 and the channel estimation result using the UL DM-RS (S317).

Base station 100 transmits the DL-RS (for example, a DMRS) to terminal 200 (S118). Note that the DL-RS may be multiplied by the DL transmission weight.

Terminal 200 performs channel estimation based on the DL DM-RS (S119), and generates the DL reception weight (S120).

As described above, in the cooperative transmission and reception control, for example, a downlink CSI-RS is used as the reference signals for channel estimation and interference power measurement. Thus, terminal 200 can generate the UL transmission weight based on the channel estimation value using the CSI-RS, for example. In addition, terminal 200 feeds back information about interference power using the CSI-RS. Base station 100 can generate the UL reception weight and the DL transmission weight based on the fed back information about the interference power. As a result, as compared with the first exemplary embodiment (for example, FIG. 7), information (for example, DL channel estimation value) to be fed back from terminal 200 to base station 100 can be reduced. This can reduce overhead caused by signaling.

Further, according to the present exemplary embodiment, base station 100 can generate the UL reception weight together with the DL transmission weight based on the UL DM-RS and the information about the DL interference power measured using the CSI-RS. Thus, for example, as in the first exemplary embodiment (for example, FIG. 7), base station 100 receives the UL-DM-RS after transmitting the DL DM-RS (for example, a DM-RS multiplied by the DL transmission weight). Thus, base station 100 does not need to generate the UL reception weight. This can simplify the transmission and reception weight generation processing.

The exemplary embodiments of the present disclosure have been described above.

The above-described exemplary embodiments refer to the case where both the interference coordination (for example, the inter-cell interference coordination) and the cooperative transmission and reception control are performed as an example. However, the inter-cell interference coordination and the cooperative MIMO transmission and reception control can be independently performed. Base station 100 and terminal 200 may perform control in any combination of the inter-cell interference coordination in the respective exemplary embodiments and the cooperative transmission and reception control in the respective exemplary embodiments. Further, base station 100 and terminal 200 may perform any one of the inter-cell interference coordination and the cooperative transmission and reception control, and not perform the other control.

Further, in the cooperative MIMO transmission and reception, the reference signal used for the interference power measurement and the channel estimation may be DL-RS (for example, CSI-RS) or UL-RS (SRS).

In the above exemplary embodiments, the CSI-RS has been described as an example of the downlink reference signal, and the SRS has been described as an example of the uplink reference signal. However, the reference signals are not limited to the CSI-RS and the SRS, and may be other reference signals.

Further, in each of the above-described exemplary embodiments, the frame format illustrated in FIG. 8 has been described as an example, but the present disclosure is not limited thereto, and other frame formats may be used.

In addition, the setting of each parameter in the above exemplary embodiments is an example and is not limited to the example. For example, the number of cells and the number of partial bands are not limited to three, and may be other values. In addition, bandwidths of the partial bands may be identical to or different from each other. The number of highest partial bands (the number of partial bands) set in each cell may be different. Further, as illustrated in FIG. 8, the resources to which the reference signal (for example, in FIG. 8, the CSI-RS) is allocated are not limited to the plurality of resources in the frequency domain, and may be time zone resources.

A function of base station 100 may be divided into functional modules such as a central unit (CU), a distributed unit (DU), and a radio unit (RU). For example, controller 101 of base station 100 may be included in the CU or the DU, and communicator 102 (for example, including distributed antennas) may be included in the RU. Note that the distribution of the functions (respective components) of base station 100 is not limited thereto, and may be other distribution of the functions. The DU may include a radio link control (RLC) function, a medium access control (MAC) function, and a high-physical layer (PHY) function. The RU may include a Low-PHY function and a radio frequency (RF) function. Alternatively, the DU may include the RLC function and the MAC function. The RU may include the PHY function (for example, including a high-PHY function and a Low-PHY function) and the RF function.

In the above-described exemplary embodiments, time resource unit may include a subframe, a slot, and a symbol, or any other time resource unit may be used. In the above-described exemplary embodiments, a frequency resource unit may include a bandwidth part (BWP), a resource block (RB), and a physical resource block (PRB), or any other frequency resource unit may be used.

In the above exemplary embodiments, the notation "unit" used for each component may be replaced with another notation such as "circuit (circuitry)", "device", or "module".
(Control Signal)

In the present disclosure, a downlink control signal (alternatively, downlink control information) according to one example may be a signal (or information) transmitted in a physical downlink control channel (PDCCH) of a physical layer, or may be a signal (or information) transmitted in a medium access control control element (MAC CE) or radio resource control (RRC) of a higher layer. Further, the signal (or information) is not limited to notification through a downlink control signal, and may be defined in advance in the specification (or the standard). Alternatively, the signal may be set in advance in the base station and the terminal.

In the present disclosure, the uplink control signal (or uplink control information) according to one example may be a signal (or information) transmitted through a physical uplink control channel (PUCCH) of a physical layer, or may be a signal (or information) transmitted through a MAC CE or an RRC of a higher layer. Further, the signal (or information) is not limited to notification through an uplink control signal, and may be defined in advance in the specification (or the standard). Alternatively, the signal may be set in advance in the base station and the terminal. Further, the uplink control signal may be replaced with, for example, uplink control information (UCI), first stage sidelink control information (SCI), or second stage SCI.
(Base Station)

In one example of the present disclosure, the base station may be a transmission reception point (TRP), a cluster head, an access point, a remote radio head (RRH), an eNodeB (eNB), a gNodeB (gNB), a base station (BS), a base transceiver station (BTS), a master unit, a gateway, or the like. In the sidelink communication, a terminal may be used instead of a base station. Instead of a base station, a relay device that relays communication between a higher node and a terminal may be used. Further, a roadside device may be used.
(Uplink, Downlink, and Sidelink)

One example of the present disclosure may be applied to any of an uplink, a downlink, and a sidelink. One example of the present disclosure may be applied to a physical uplink shared channel (PUSCH), a physical uplink control channel (PUCCH), or a physical random access channel (PRACH) of the uplink. One example of the present disclosure may be applied to a physical downlink shared channel (PDSCH), a PDCCH, or a physical broadcast channel (PBCH) of the downlink. Further, one example of the present disclosure may be applied to a physical sidelink shared channel (PSSCH), a physical sidelink control channel (PSCCH), or a physical sidelink broadcast channel (PSBCH).

The PDCCH, the PDSCH, the PUSCH, and the PUCCH are examples of a downlink control channel, a downlink data channel, an uplink data channel, and an uplink control channel, respectively. The PSCCH and the PSSCH are examples of a sidelink control channel and a sidelink data channel, respectively. Further, the PBCH and the PSBCH are examples of alarm (broadcast) channels, and the PRACH is an example of a random access channel.
(Data Channel and Control Channel)

One example of the present disclosure may be applied to any of data channels and control channels. For example, the channel in one example of the present disclosure may be replaced with any of a PDSCH, a PUSCH, and a PSSCH of a data channel. Alternatively, the channel may be replaced with any of a PDCCH, a PUCCH, a PBCH, a PSCCH, and a PSBCH of a control channel.
(Reference Signal)

In one example of the present disclosure, the reference signal is, for example, a signal known by both the base station and the mobile station, and may be also referred to as a reference signal (RS) or a pilot signal. The reference signal may be any of a demodulation reference signal (DMRS), a channel state Information-reference signal (CSI-RS), a tracking reference signal (TRS), a phase tracking reference signal (PTRS), a cell-specific reference signal (CRS), and a sounding reference signal (SRS).
(Time Interval)

In one example of the present disclosure, the time resource unit is not limited to one or a combination of a slot and a symbol, and may be, for example, a time resource unit such as a frame, a super frame, a subframe, a slot, a timeslot subslot, a mini-slot, or a symbol, an orthogonal frequency division multiplexing (OFDM) symbol, or a single carrier-frequency division multiplexing (SC-FDMA) symbol. Alternatively, the time resource unit may be other time resource units. In addition, the number of symbols included in one slot is not limited to the number of symbols exemplified in the above-described exemplary embodiments, and may be other numbers of symbols.

(Frequency Band)

One example of the present disclosure may be applied to either a licensed band or an unlicensed band.

(Communication)

One example of the present disclosure may be applied to any of communication between a base station and a terminal (Uu link communication), communication between a terminal and a terminal (sidelink communication), and vehicle-to-everything communication (V2X). The channel in one example of the present disclosure may be replaced with any of a PSCCH, a PSSCH, a physical sidelink feedback channel (PSFCH), a PSBCH, a PDCCH, a PUCCH, a PDSCH, a PUSCH, and PBCH.

One example of the present disclosure may be applied to any of a terrestrial network, and a non-terrestrial network (NTN) using a satellite or a high altitude pseudo satellite (HAPS). Further, one example of the present disclosure may be applied to a terrestrial network having a transmission delay larger than a symbol length or a slot length, such as a network having a large cell size or an ultra-wideband transmission network.

(Antenna Port)

In one example of the present disclosure, an antenna port refers to a logical antenna (antenna group) composed of one or more physical antennas. For example, the antenna port does not necessarily refer to one physical antenna, and may refer to an array antenna or the like including a plurality of antennas. For example, the number of physical antennas included in the antenna port is not defined, and may be defined as a minimum unit in which a terminal station can transmit a reference signal. Further, the antenna port may be defined as a minimum unit for multiplication by weighting of a precoding vector.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The terminal (UE) that communicates with the base station in the present disclosure includes all types of apparatuses, devices, and systems (collectively referred to as a communication apparatus) having a communication function. The communication apparatus may include a radio transceiver and a processing and control circuitry. The radio transceiver may include a receiver and a transmitter, or include receiving and transmitting functions. The radio transceiver (the transmitter and the receiver) may include a radio frequency (RF) module and one or more antennas. The RF module may include an amplifier, and an RF modulator and demodulator, or the like. Some non-limiting examples of communication apparatus include a phone (e.g., cellular (cell) phone, smart phone), a tablet, a personal computer (PC) (e.g., laptop, desktop, notebook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to one example of the present disclosure includes communication circuitry which, in operation, transmits or receives a reference signal in a plurality of bands using a part of a plurality of antennas, and control circuitry which, in operation, determines which of the plurality of bands to allocate to a terminal, based on a result of measurement using the reference signal.

In one example of the present disclosure, the communication circuitry receives, from the terminal, the result of the measurement by the terminal using the reference signal transmitted in a downlink.

In one example of the present disclosure, the communication circuitry receives the reference signal transmitted from the terminal in an uplink, and the control circuitry performs the measurement using the reference signal transmitted in the uplink.

In one example of the present disclosure, resources allocated to the reference signal are different among a plurality of cells.

A base station according to one example of the present disclosure includes control circuitry which, in operation, controls generation of a transmission weight based on a result of measurement using a first reference signal and a second reference signal, wherein resources orthogonal to each other among antenna groups are allocated to the second reference signal, resources orthogonal to each other within each of the antenna groups are allocated to the first reference signal, and the antenna groups form clusters in a cell, and communication circuitry which, in operation, performs communication using the transmission weight.

In one example of the present disclosure, the result of the measurement includes a channel estimation value based on the first reference signal and interference power for a terminal based on the second reference signal.

In one example of the present disclosure, the first reference signal and the second reference signal are downlink reference signals, and the transmission weight is a downlink transmission weight.

In one example of the present disclosure, the first reference signal and the second reference signal are uplink reference signals, and the transmission weight is a downlink transmission weight.

In one example of the present disclosure, the first reference signal is an uplink reference signal and the second reference signal is a downlink reference signal, and the transmission weight is a downlink transmission weight.

In one example of the present disclosure, the first reference signal and the second reference signal are downlink reference signals, and the transmission weight is an uplink transmission weight.

A terminal according to one example of the present disclosure includes control circuitry which, in operation, controls generation of a transmission weight based on a result of measurement using a first reference signal and a second reference signal, wherein resources orthogonal to each other among antenna groups are allocated to the second reference signal, resources orthogonal to each other within each of the antenna groups are allocated to the first reference signal, and the antenna groups form clusters in a cell, and communication circuitry which, in operation, performs communication using the transmission weight.

In a communication method according to one example of the present disclosure, a base station transmits or receives a reference signal in a plurality of bands using a part of a plurality of antennas, and determines which of the plurality of bands to allocate to a terminal, based on a result of measurement using the reference signal.

In a communication method according to one example of the present disclosure, a base station controls generation of a transmission weight based on a result of measurement using a first reference signal and a second reference signal, wherein resources orthogonal to each other among antenna groups are allocated to the second reference signal, resources orthogonal to each other within each of the antenna groups are allocated to the first reference signal, and the antenna groups form clusters in a cell, and performs communication using the transmission weight.

In a communication method according to one example of the present disclosure, a terminal controls generation of a transmission weight based on a result of measurement using a first reference signal and a second reference signal, wherein resources orthogonal to each other among antenna groups are allocated to the second reference signal, resources orthogonal to each other within each of the antenna groups are allocated to the first reference signal, and the antenna groups form clusters in a cell, and performs communication using the transmission weight.

One example of the present disclosure is useful in the wireless communication system.

What is claimed is:

1. A base station comprising:
control circuitry which, in operation, controls generation of a transmission weight based on a result of measurement using first reference signals and second reference signals using a plurality of antennas, wherein
the plurality of antennas are formed of a plurality of clusters,
the second reference signals that are orthogonal to each other are allocated to antennas among the plurality of clusters, and
the first reference signals that are orthogonal to each other are allocated to antennas within each cluster of the plurality of clusters; and
communication circuitry which, in operation, performs communication using the transmission weight,
wherein if a distance between two clusters of the plurality of clusters is less than or equal to a distance threshold, the first reference signals allocated to the two clusters are orthogonal to each other.

2. The base station according to claim 1, wherein the result of the measurement includes channel estimation values based on the first reference signals and interference powers for a terminal based on the second reference signals.

3. The base station according to claim 1, wherein
the first reference signals and the second reference signals are downlink reference signals, and
the transmission weight is a downlink transmission weight.

4. The base station according to claim 1, wherein
the first reference signals and the second reference signals are uplink reference signals, and
the transmission weight is a downlink transmission weight.

5. The base station according to claim 1, wherein
the first reference signals are uplink reference signals and the second reference signals are downlink reference signals, and
the transmission weight is a downlink transmission weight.

6. The base station according to claim 1, wherein
the first reference signals and the second reference signals are downlink reference signals, and
the transmission weight is an uplink transmission weight.

7. A terminal comprising:
control circuitry which, in operation, controls generation of a transmission weight based on a result of measurement using first reference signals and second reference signals using a plurality of antennas, wherein
the plurality of antennas are formed of a plurality of clusters,
the second reference signals that are orthogonal to each other are allocated to antennas among the plurality of clusters, and
the first reference signals that are orthogonal to each other are allocated to antennas within each cluster of the plurality of clusters; and
communication circuitry which, in operation, performs communication using the transmission weight,
wherein if a distance between two clusters of the plurality of clusters is less than or equal to a distance threshold, the first reference signals allocated to the two clusters are orthogonal to each other.

8. A communication method performed by a base station, the communication method comprising:
  controlling generation of a transmission weight based on a result of measurement using first reference signals and second reference signals using a plurality of antennas, wherein
    the plurality of antennas are formed of a plurality of clusters,
    the second reference signals that are orthogonal to each other are allocated to antennas among the plurality of clusters, and
    the first reference signals that are orthogonal to each other are allocated to antennas within each cluster of the plurality of clusters; and
  performing communication using the transmission weight,
  wherein if a distance between two clusters of the plurality of clusters is less than or equal to a distance threshold, the first reference signals allocated to the two clusters are orthogonal to each other.

9. A communication method performed by a terminal, the communication method comprising:
  controlling generation of a transmission weight based on a result of measurement using first reference signals and second reference signals using a plurality of antennas, wherein
    the plurality of antennas are formed of a plurality of clusters,
    the second reference signals that are orthogonal to each other are allocated to antennas among the plurality of clusters, and
    the first reference signals that are orthogonal to each other are allocated to antennas within each cluster of the plurality of clusters; and
  performing communication using the transmission weight,
  wherein if a distance between two clusters of the plurality of clusters is less than or equal to a distance threshold, the first reference signals allocated to the two clusters are orthogonal to each other.

* * * * *